US004001681B2

United States Statutory Invention Registration [19]

[11] Reg. Number: H1681

[45] Published: Oct. 7, 1997

Johanson et al.

[54] DISCHARGE FROM PULPING VESSELS WITHOUT THE AID OF MECHANICAL AGITATION

[75] Inventors: Jerry R. Johanson, San Luis Obispo, Calif.; J. Robert Prough; J. Wayne Chamblee, both of Queensbury, N.Y.

[73] Assignee: Ahlstrom Machinery Inc., Glens Falls, N.Y.

[21] Appl. No.: 529,411

[22] Filed: Sep. 18, 1995

Related U.S. Application Data

[63] Continuation-in-part of Ser. No. 401,503, Mar. 10, 1995.

[51] Int. Cl.[6] ..... D21C 7/14

[52] U.S. Cl. ..... 162/243

*Primary Examiner*—Charles T. Jordan
*Assistant Examiner*—Meena Chelliah
*Attorney, Agent, or Firm*—Nixon & Vanderhye P.C.

[57] ABSTRACT

A continuous digester discharges pulp without mechanically engaging the pulp, by using one or more discharge transitions with one dimensional convergence and side relief. The transitions may be mounted within a pre-existing digester shell (after removal of the discharge rotor), and supported by a number of braces and/or a skirt shaped like a truncated cone. The operation of a digester, or other continuous vessel, may be controlled by automatically sensing the level of comminuted cellulosic fibrous material in the vessel and automatically controlling the introduction of dilution liquid into the vessel to discharge the material from the vessel in response to the sensing.

20 Claims, 19 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 6A
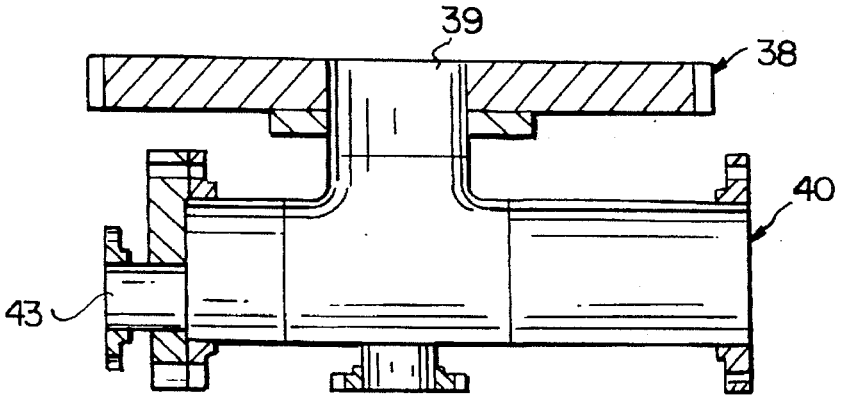
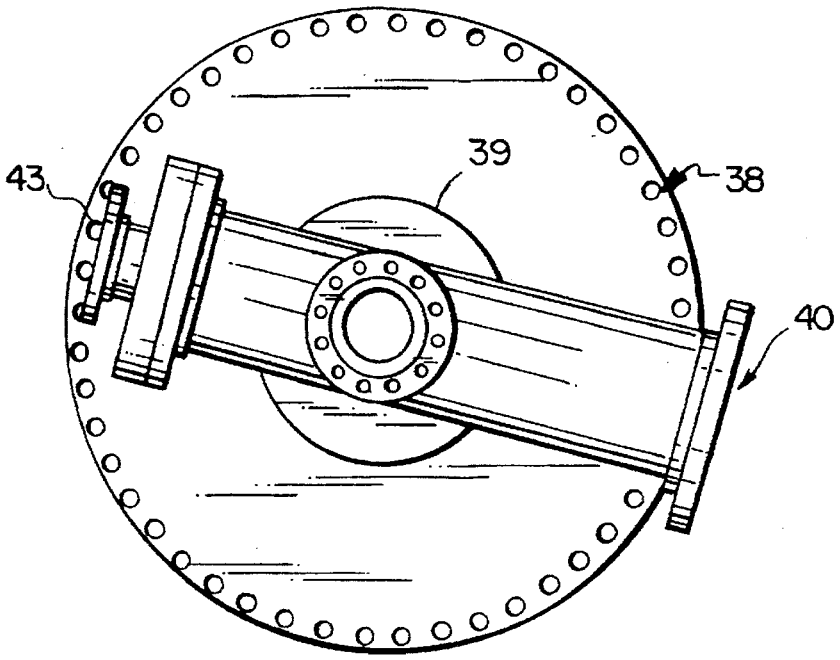
FIG. 6B

DISCHARGE FROM PULPING VESSELS WITHOUT THE AID OF MECHANICAL AGITATION

CROSS-REFERENCE TO RELATED APPLICATION

This is a continuation-in-part of application Ser. No. 08/401,503 filed Mar. 10, 1995, copending.

BACKGROUND AND SUMMARY OF THE INVENTION

The modem pulp mill contains various storage and treatment vessels through which pulp and other media pass during the pulping process. This media typically includes comminuted cellulosic fibrous material in various forms, including wood chips, liquor-impregnated or pretreated wood chips, unbleached wood pulp or bleached wood pulp, among other wood and non-wood (e.g. bagasse) forms. These vessels typically include an inlet and an outlet. The inlet may be at the bottom of the vessel and the media flows upward to an outlet at the top, or vice versa. In either case, the outlet typically consists of some form of restriction leading to a conduit into which the media flows to the next treatment or storage vessel.

To accommodate this restriction, the generally cylindrical treatment vessel normally includes some form of converging transition section, typically conical in shape, which directs the material to the outlet of the vessel. However, comminuted cellulose material, in its various forms, under the force of gravity or pressure, will not freely flow through a conical restriction unless the angle of that conical restriction is less than a particular "critical angle". This critical angle is material specific and can be obtained through laboratory evaluation. At angles greater than this critical angle, the material will tend to plug the transition by "bridging" or forming a stable arch of material across the conical convergence. For example, for wood chips a conical convergence must not exceed an angle of about 10 degrees (the critical angle) from the vertical to avoid material bridging.

Since convergence angles of only 10 degrees require a long vessel transition length to converge from an initial diameter to a smaller diameter of an outlet or discharge, convergence angles typically used are greater than 10 degrees. Therefore, to prevent bridging of the media across a convergence, the discharge of media from a vessel is conventionally aided by a rotating mechanical device, for example an "agitator", "scraper", or "discharge device". These devices prevent the material from plugging or bridging the discharge area by continuously disrupting any pluggage that may occur. The mechanical device may take various forms depending upon the application, but commonly includes a central hub with radial arms with paddies or deflectors which agitate the media and direct it toward the outlet. These devices are typically driven by electric motors which transmit power to the device by some form of mechanical power transfer device, for example a gear box, belt drive, or chain drive.

This existing technology for discharging material from these vessels has several disadvantages. First, the rotating device, regardless of shape, requires the use of miscellaneous hardware. This hardware typically includes bearings to support the rotating device, seals to prevent leakage of process gases and liquids where the drive mechanism penetrates the vessel, among other things, and miscellaneous hardware to support or retain the seals, bearings, and other hardware.

Secondly, this hardware, along with the rotating device itself, requires regular maintenance to maintain the equipment in working order or to replace worn or damaged pieces of hardware. This usually requires that a mill define a maintenance program to schedule regular inspection of the mechanical drive, the bearings and seals, and the discharging apparatus. Typically, each scheduled maintenance inspection requires that the vessel containing the discharge device, as well as adjoining equipment and vessels, be evacuated. Of course, this procedure usually requires that the entire pulp line be shut down, with consequent loss of production.

Thirdly, existing mechanical discharge devices also have the potential to damage the media being discharged. This is particularly significant when the media, for example, wood chips, are in a hot, alkaline state. Excessive agitation of hot, alkaline wood chips may cause fiber damage which can result in reduced strength of the paper product produced. Therefore, minimization of mechanical action upon the material being discharged is preferred. The potential damage as a result of mechanical action has been recognized for many years—as exemplified by U.S. Pat. No. 4,432,836—however even with that recognition mechanical agitators are not known to have heretofore been eliminated.

Recent advances in the storage and transport of wood chips in a pulp mill include the design and use of a novel discharge geometry for a chip bin employing the single-convergence transition principle of bin design. This modular design, as disclosed in general in U.S. Pat. No. 4,958,741 (the disclosure of which is hereby incorporated by reference herein), permits "mass flow" of material in comparison to "funnel flow". Mass flow is characterized as providing substantially uniform downward movement of material across a cross-section of a vessel. Funnel flow, in comparison, is characterized by gross variation in downward flow velocity between the inner surface of the vessel wall and the center of the vessel—a flow regime that, for comminuted cellulose material, promotes pluggage and non-uniform treatment of the material. Specific applications of the mass-flow, single-convergence design to the transportation and storage of wood chips are disclosed in co-pending applications 08/189,546, filed on Feb. 1, 1994 (attorney. ref. 10-926), and 08/366,581, filed on Dec. 30, 1994 (attorney. ref. 10-1020). These applications, whose disclosures are incorporated by reference into this application, disclose novel methods of discharging comminuted wood chips from a cylindrical vessel without the aid of a rotating or vibrating discharge device.

According to the broadest aspect of this invention, a method and apparatus are provided for pulping comminuted cellulosic fibrous material using cylindrical vessels without the aid of a rotating or vibrating mechanical devices. These vessels employ a conical transition, the convergence angle of which does not exceed the critical angle of the material being treated and conveyed.

Since the required retention times for pulping vessels varies from 0.5 to 8 hours, and the discharge outlet from these vessels may be only 2 to 3 feet in diameter, a vessel, for example which has a conical convergence angle of only 10 degrees, may have to be impractically tall. However, such vessels may not be conical in shape but may employ a single-convergence, mass-flow transition as disclosed in U.S. Pat. No. 4,958,741 or similar technology (sold under the trademark DIAMONDBACK). For example, a pulping vessel may include one or more single-convergence transitions with side relief as shown for the chip bins of copending applications 08/189,546 (attorney. ref. 10-926) and 08/366,581, (attorney. ref. 10-1020).

The invention relates to a method and apparatus (vessels and systems) for pulping comminuted cellulosic fibrous material without the aid of rotating or vibrating mechanical devices, and having converging transitions employing single-convergence and side relief. This method and apparatus may also utilize vessel geometries that promote mass flow of the material by converging flow from a cylindrical vessel with a first cross-sectional area to a vessel or outlet with a second cross-sectional area at least 50% less than the first cross-sectional area, and typically less than 10% of the first cross-sectional area.

For example a method is provided for pulping comminuted fibrous material in a digester system having a feed system, an impregnation or pretreatment vessel and a digester, comprising the steps of: a) presteaming the fibrous material in the feed system to remove air from the material, b) introducing a cooking liquor to the presteamed material to produce a slurry of material and liquor, c) transferring the slurry to one or more vessels to effect pulping of the material, and d) discharging the pulped material from the one or more vessels without the aid of a rotating or vibrating mechanical device.

The presteaming of step a) may be performed in a chip bin as described in pending applications 08/189,546 (attorney. ref. 10-926), and 08/366,581 (attorney. ref. 10-1020). The slurrying and transferring of steps b) and c) may be practiced using the methods disclosed in co-pending applications 08/267,171 (10-961), filed Jun. 16, 1994, or 08/354,005 (10-1018), filed Dec. 5, 1994, the disclosures of which are hereby incorporated by reference herein, or using conventional chute and high pressure transfer device arrangements. The cooking liquor of step b) may be kraft white liquor, green liquor, or black liquor, sulfite liquor or soda pulping liquor, with or without the addition of anthraquinone (or its equivalent or derivatives) or sulfide-enhancing additives, such as polysulfide.

The practice of the discharging step d) may be performed using a single-convergence transition which promotes mass flow of the material as shown in U.S. Pat. No. 4,958,741, the disclosure of which is incorporated by reference herein.

A method of pulping comminuted cellulosic fibrous material using at least one generally elongated vertical vessel having a first cross-sectional area, and an outlet with a cross-sectional area less than 50% of the first cross-sectional area, is provided. The method comprises the following steps: (a) Presenting cellulosic fibrous material to remove air from the material. (b) Introducing a cooking liquor into the material to produce a slurry of material and liquor having a consistency of at least 5%. (c) Introducing the slurry into the at least one generally vertically elongated vessel, and effecting pulping of the material in the vessel with a consistency of at least 5%. And, (d) discharging the material at a consistency of at least 5% from the vessel outlet without plugging and without any mechanical action by moving mechanical elements on the material.

The vessel typically has tapered side walls adjacent the outlet and step (d) is practiced by causing the material to flow out the outlet along the tapered side walls. Dilution liquid may be introduced under superatmospheric pressure adjacent the discharge to facilitate the discharge. Typically the tapering of the side walls includes a transition having one dimensional convergence and side relief, and step (d) is practiced by causing the material to flow out the outlet through the transition having one dimensional convergence and side relief.

The vessel may be an impregnation vessel in which case step (c) is practiced to effect impregnation of the material with cooking liquor at a temperature below cooking temperature, and the method comprises the further step (e), after step (d), of transferring the impregnated material to the top of the digester. Typically the cross-sectional area of the outlet is less than 1/10 the first cross-sectional area, and step (d) is practiced to cause the material to flow from a first circular shaped cross-section to a first obround cross-section, to a second circular shaped cross-section to a second obround cross-section, to a third circular shaped cross-section through which the material is discharged; step (d) may be further practiced by causing the material to flow between a fourth circular shaped cross-section and a third obround cross-section between the second obround cross-section and the third circular shaped cross-section. There may also be the further step of introducing liquid (i.e. dilution liquid) under superatmospheric pressure into the material as it is being discharged through at least the third circular shaped cross-section to facilitate discharge of the material through the outlet.

Where the vessel is a digester step (c) is practiced to cook the material at cooking temperature is the digester to produce digested material, and there is the further step, after step (d), of transferring the digested material to washing or bleaching stages (typically first washing and then bleaching).

The invention also relates to a method of utilizing an impregnation vessel for impregnating comminuted cellulosic fibrous material with cooking liquor, the vessel having an outlet with a mechanical discharge device located within—and cooperating with—a support baffle and baffle support, to facilitate discharge of cellulosic comminuted fibrous material therefrom, and a corresponding method for a continuous digester. The method comprises (for the impregnation vessel) the steps of: (a) removing the mechanical discharge device from the outlet of the impregnation vessel; then (b) installing within the support baffle and baffle support a discharge transition having one dimensional convergence and side relief so that the comminuted cellulosic fibrous material must pass through the discharge transition to pass from the interior of the vessel to the outlet; and then (c) operating the impregnation vessel to effect impregnation of the material with cooking liquor within the vessel interior and discharge of the impregnated material out the outlet through the discharge transition without bringing any moving mechanical elements into contact with the material within the vessel to facilitate discharge thereof. Step (b) may be practiced, at least in part, by supporting the discharge transition on the support baffle using a support skirt. Step (b) may also be practiced to provide nozzles for the introduction of dilution liquid into the material as it flows in the discharge transition, and step (c) practiced to introduce dilution liquid through the nozzles into the material as it flows down the discharge transition. Step (c) may be practiced to cause the material to flow through the circular shaped cross-sections and obround cross-sections in the same manner as described above with respect to the impregnation vessel.

For a digester the method comprises the steps of: (a) Removing the mechanical discharge device from the outlet of the digester, out of the digester shell. Then (b), installing within the outlet, without the digester shell, a discharge transition having one dimensional convergence and side relief so that the pulp must pass through the discharge transition to pass from the interior of the digester to the outlet. And then, (c) operating the digester to effect cooking of the material with cooking liquor within the vessel interior and discharge of the pulp produced out the outlet through the discharge transition without bringing any moving mechanical elements into contact with the material or pulp within the vessel to facilitate discharge thereof. The digester typically includes a bottom hemispherical head, and step (b) is practiced, at least in part, by supporting the discharge transition on a conical support skirt (either continuous or discontinuous) engaging the head. Step (b) may also be practiced to provide nozzles for the introduction of dilution liquid into the material as it flows in the discharge transition, and step (c) may be practiced to introduce dilution liquid through the nozzles into the material as it flows in the discharge transition. Step (c) may be practiced to introduce the dilution liquid through the nozzles into the pulp below the head as the pulp flows in the discharge transition, and step (c) may also be practiced to cause the material to flow through a device having one dimensional convergence and side relief. The device with one dimensional convergence and side relief may comprise at least two sloping sides and step (b) may be practiced by inserting braces between the digester and the sloping sides, the braces having a degree of adjustment.

According to another aspect of the present invention a digester for digesting comminuted cellulosic fibrous material is provided. The digester comprises the following elements: A substantially cylindrical upright vessel having a top and a bottom, a first circular cross section at the top thereof, and a second circular cross section at the bottom thereof that is greater than the first cross section, the vessel being at least forty feet high. A pulp outlet from the bottom of the vessel, the pulp outlet having a third cross-section that is less than one-fifth the cross-sectional area of the second cross section. A screen for extracting liquid from material and causing the extracted liquid to pass outside of the vessel, the screen mounted adjacent but above the pulp outlet. And, discharge means between the screen and the pulp outlet for causing pulp to flow without hangup and without bringing any moving mechanical element into contact therewith from below the screen to is the pulp outlet, the vessel interior below the screen being devoid of moving mechanical elements which come into contact with pulp.

The discharge means of the digester preferably comprises a discharge transition with one dimensional convergence and side relief and means for introducing dilution liquid into the vessel into contact with the pulp below the screen. A low profile anti-bridging cone may be provided between the screen and the discharge transition, or in place of the discharge transition. The discharge transition may comprise a hollow transition comprising: A first, uppermost, portion having a generally right rectangular parallelepiped configuration including opposite side faces having generally triangular shapes, and providing one dimensional convergence and side relief. A second portion tapering from a generally rectangular parallelepiped configuration at an upper part thereof to a generally circular configuration at a lower part thereof and having opposite side faces having generally triangular shapes which align with the first portion generally triangular shapes to define substantially diamond shaped wall portions. A third portion substantially the same as the first portion, only smaller, and connected to the second portion lower part. And, a fourth, lowermost, portion substantially the same as the second portion only smaller, and connected to the third portion in the same manner as the second portion is connected to the first portion, and connected to the pulp outlet. The digester may include a pre-existing digester shell surrounding the transition, and supporting means may be provided disposed between the shell and transition for supporting the transition. The supporting means may comprise a plurality of braces extending between the digester shell and the transition, and/or a substantially truncated continuous or discontinuous conical skirt engaging a hemispherical head of the digester and the discharge transition, or jacks, platforms, solid or foamed fill material, or the like. The dilution liquid introducing means may include a dilution plenum disposed between the second and third portions of the discharge transition for introducing dilution liquid generally at the interface therebetween, and the amount of liquid introduced by the dilution liquid introducing means may be controlled by a level controller (e.g. computerized) controlling an automatic valve and receiving input from a level detector. The dilution liquid introducing means includes at least one dilution liquid nozzle for introducing dilution liquid into the transition below the head.

An impregnation vessel for impregnating comminuted cellulosic fibrous material to produce cellulose pulp is also provided. The impregnation vessel comprises the following elements: A substantially cylindrical upright vessel having a top and a bottom, a first circular cross section at the top thereof, and a second circular cross section at the bottom thereof that is greater than the first cross section, the vessel being at least twenty feet high. An impregnated material outlet from the bottom of the vessel, the impregnated material outlet having a third cross-section that is less than one-fifth the cross-sectional area of the second cross section. And, discharge means at the bottom of the vessel above the impregnated material outlet for causing impregnated material to flow without hangup, and without bringing any moving mechanical element into contact therewith, out the impregnated material outlet, the vessel interior being devoid of moving mechanical elements which come into contact with impregnated material to facilitate discharge thereof.

The impregnated material outlet preferably comprises a flange, a downwardly extending conduit from the flange, a cross-conduit intersecting the downwardly extending conduit and having first and second ends thereof on opposite sides of the downwardly extending conduit; the first end including a nozzle for the introduction of dilution liquid, and the second end being open for the discharge of impregnated material therefrom. The discharge means may comprise a discharge transition with one dimensional convergence and side relief, and a perforated conduit element extending from a bottom portion of the discharge transition toward the downwardly extending conduit of the impregnated material outlet.

A system for making chemical pulp from cellulose material is also provided herein. The system comprises the following elements: Means for steaming cellulose material to remove air therefrom and discharging the steamed cellulose material through a first outlet. Means for slurrying cellulose material discharged from the first outlet, and for discharging the slurried cellulose material out a second outlet. A high pressure transfer device for pressurizing the slurried material from the second outlet and discharging it through a third outlet. A substantially vertical continuous digester having a top and a bottom and an inlet adjacent the top, and a first cross-sectional area adjacent the bottom thereof. Means for operatively connecting the third outlet to the digester inlet to allow passage of slurried material from the high pressure transfer device to the digester. A pulp outlet from the bottom of the digester, the pulp outlet having a second cross-sectional area that is less than one-fifth the first cross-sectional area. A screen for extracting liquid from material and causing the extracted liquid to pass outside of the vessel, the screen mounted adjacent but above the pulp outlet, and at the first cross-sectional area. And, discharge means between the screen and the pulp outlet for causing pulp to flow without hangup and without bringing any moving mechanical element into contact therewith from below the screen to the pulp outlet, the vessel interior below the screen being devoid of moving mechanical elements which come into contact with pulp.

The discharge means for the digester is preferably as described above.

The invention also is applicable to the pulping of cellulose material that is easier to impregnate such as hardwoods, sawdust, or non-wood cellulosic fibrous material. Non-wood fiber, such as bagasse and corn stalks, is similar to hardwood and sawdust in that it is easier to impregnate and cook so that shorter cooking times and simpler cooking devices can be used, as generally disclosed in co-pending application Ser. No. 08/041,572 filed Apr. 5, 1993. That is, impregnation vessels are not necessary, and cooking liquor addition may be provided at the end of a chip bin or a horizontal or vertical steaming vessel. According to this aspect of the present invention the system comprises: A steaming vessel having an inlet for cellulose material, an outlet for steamed material, and means for introducing steam into the vessel. A vent from the steaming vessel inlet. A blowback control device in the steaming vessel inlet. Means for adding cooking liquor into the steaming vessel before the outlet thereof. A substantially vertical digester having a top and bottom, an inlet directly connected to the steaming vessel outlet, and a pulp outlet. And, discharge means adjacent the digester bottom and above the pulp outlet for causing pulp to flow without hangup and without bringing any moving mechanical element into contact therewith, the vessel devoid of moving mechanical elements which come into contact with pulp to facilitate discharge from the pulp outlet.

The steaming vessel may be immediately above the digester inlet, or connected by a conduit directly to the digester inlet (e.g. where the digester is next to the steaming vessel), with or without a high pressure pump in between. Means also may be provided for adding dilution liquid to the material at the digester inlet. The steaming vessel may comprise a vertical steaming vessel having a transition at the outlet, the transition having one dimensional convergence and side relief, and the discharge means for the digester may be as described above with respect to the other embodiments. A feeding means may feed chips to the steaming vessel, and the feeding means may comprise a plug screw feeder, a RING® press (available from Kamyr, Inc. of Glens Falls, N.Y.), a pocket feeder, inclined conveyor, or a like conventional structure. The feeding means may be connected to a chip bin, which may be of the type such as described in said co-pending applications Ser. Nos. 08/189,546 filed Feb. 1, 1994 or 08/366,581 filed Dec. 30, 1994.

The invention also relates to a method of controlling operation of a vessel (such as an impregnation vessel, chip bin, continuous digester, or the like) containing comminuted cellulosic fibrous material, and having an inlet, an outlet with single convergence and side relief, and dilution liquid introduction into one or more locations in the outlet. The method comprises the steps of substantially continuously: (a) Automatically introducing a liquid slurry of the material into the inlet of the vessel to form a level of material in the vessel. (b) Automatically detecting the level of the material in the vessel. (c) Automatically controlling the flow of dilution liquid to the one nor more locations in the outlet in response to variations in the material level detected in step (b). And, (d) automatically discharging the material slurry from the outlet of the vessel. Step (c) may be practiced by close loop control (such as by a computer controller) of at least one automatic valve.

It is the primary object of the present invention to provide effective non-destructive discharge of cellulose materials from impregnation vessels, digesters, and the like in the production of cellulose pulp, and associated methods of discharge from and operation of vessels. This and other objects of the invention will become clear from an inspection oft he detailed description of the invention and from the appended claims.

BRIEF DESCRIPTION OF THE DRAWINGS

FIG. 6A is a detail cross-sectional view of the outlet alone of the vessel of FIG. 5, rotated 90° from the position illustrated in FIG. 5, and FIG. 6B is a bottom plan view of the outlet of FIG. 6A;

DETAILED DESCRIPTION OF THE DRAWINGS

Figure 1:
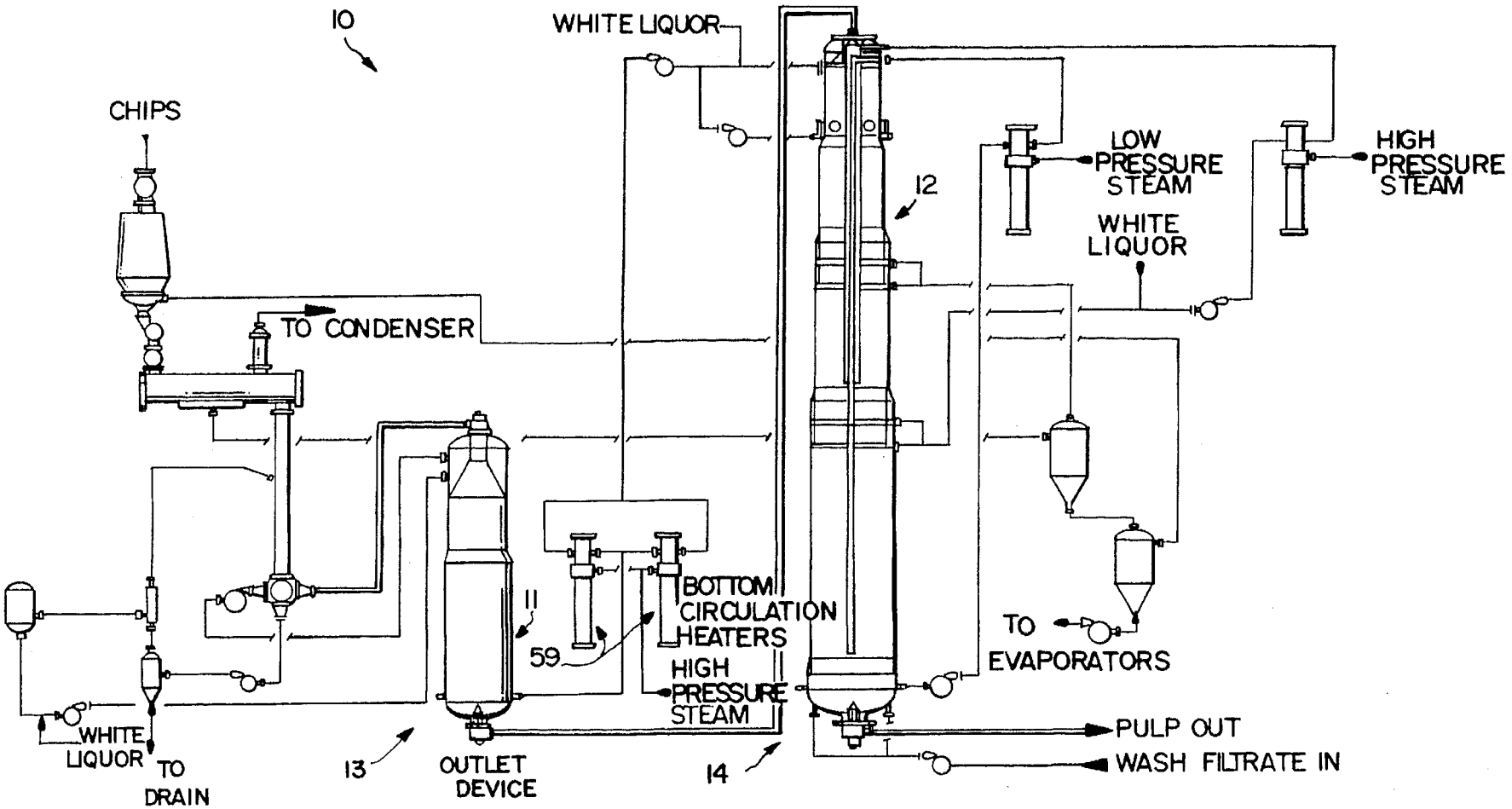
FIG.1 (PRIOR ART)
FIG. 1 is a schematic view of a typical, modem, two-vessel digester system for producing paper pulp.
Figure 2:
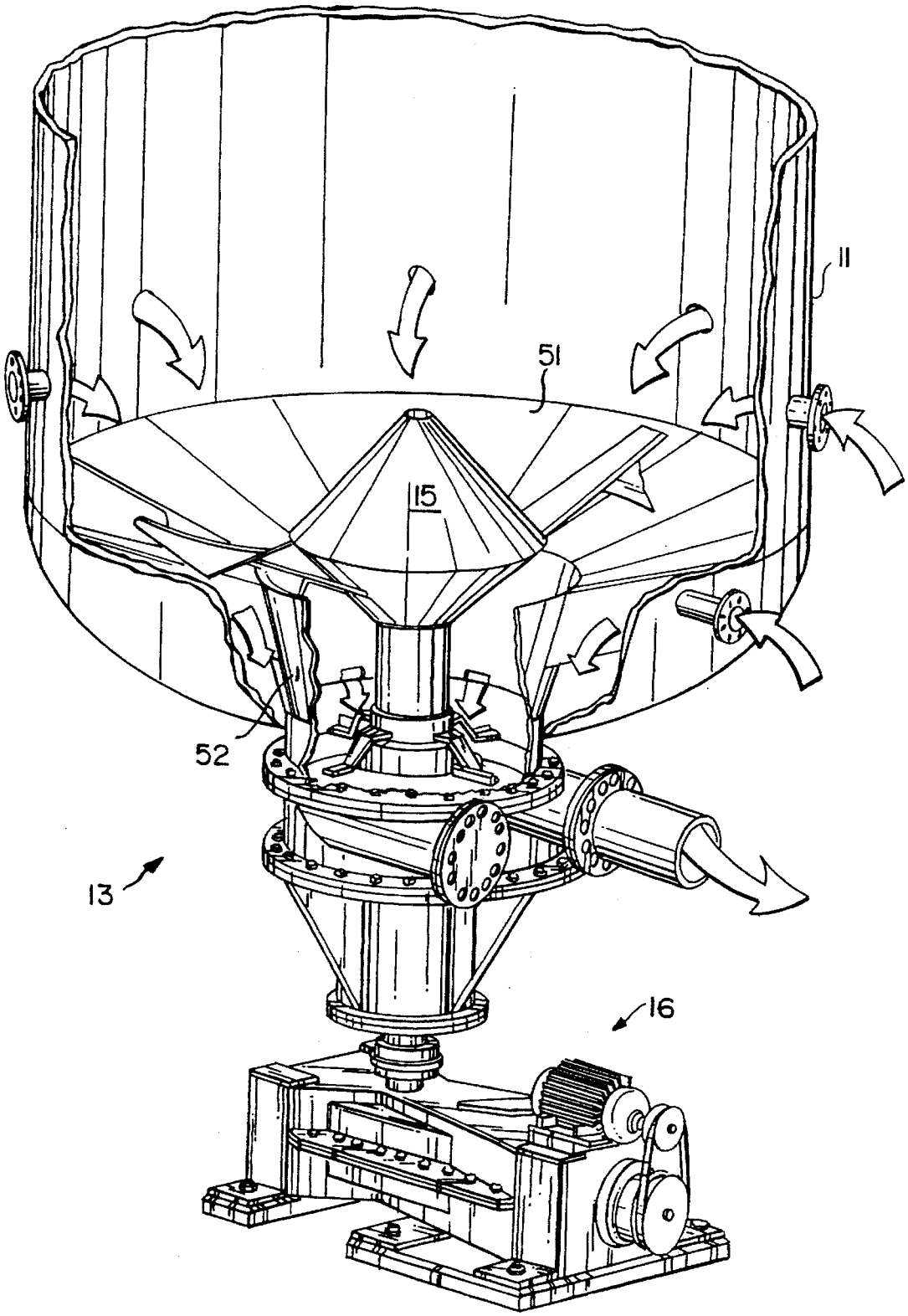
FIG. 2 (PRIOR ART)
FIG. 2 is a perspective view, with portions cut away for clarity of illustration, of the bottom of a typical prior art continuous impregnation or pretreatment vessel.

FIG. 1 schematically illustrates the components of a modern continuous two-vessel, hydraulic digester system, 10. As shown the impregnation or pretreatment vessel 11 (typically at least 20 feet tall), and digester 12 (typically at least 40 feet tall), both include discharge (outlet) devices, 13 and 14, respectively. FIG. 2 illustrates a typical outlet device 13 and shell configuration for the impregnation vessel 11. As shown a typical outlet device 13 includes a rotating element, 15, and a drive mechanism, 16. Though not shown, it is understood that the rotating element 15 and drive mechanism 16 have internal components, such as bearings and seals, which during operation become worn or damaged and require regular maintenance, inspection, and repair.

Figure 3:
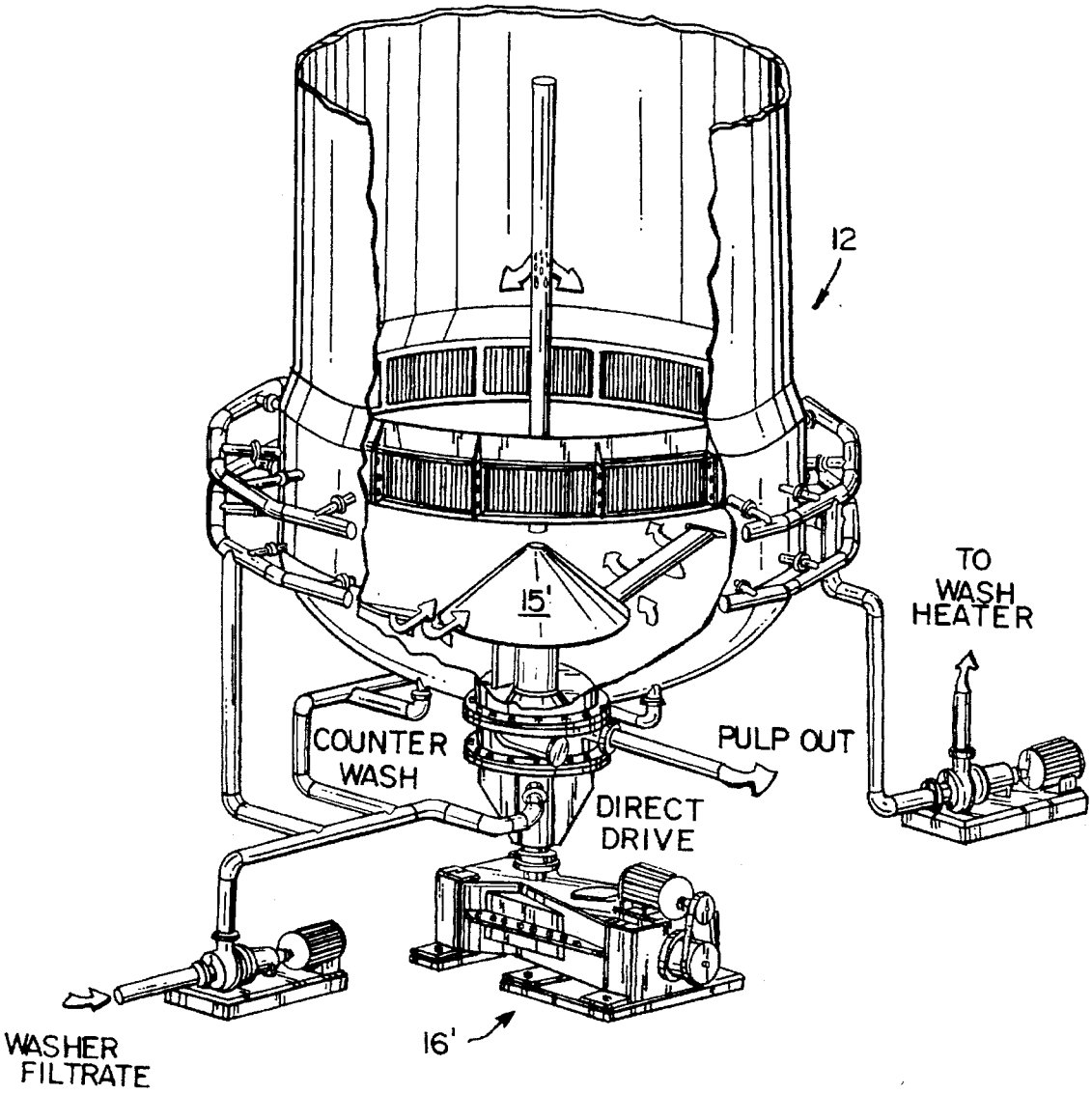
FIG. 3 (PRIOR ART)
FIG. 3 is a view like that of FIG. 2 of the bottom of a typical prior art continuous digester.

A similar detail of the typical prior art discharging device and mechanical drive for the digester, 12, shown in FIG. 1 is depicted in FIG. 3. FIG. 3 illustrates a rotating element 15' and a drive mechanism 16' similar to the elements 15, 16 shown in FIG. 2. Both this outlet device 15, 16 and the outlet device 15',16' have the limitations outlined earlier.

Figure 4:
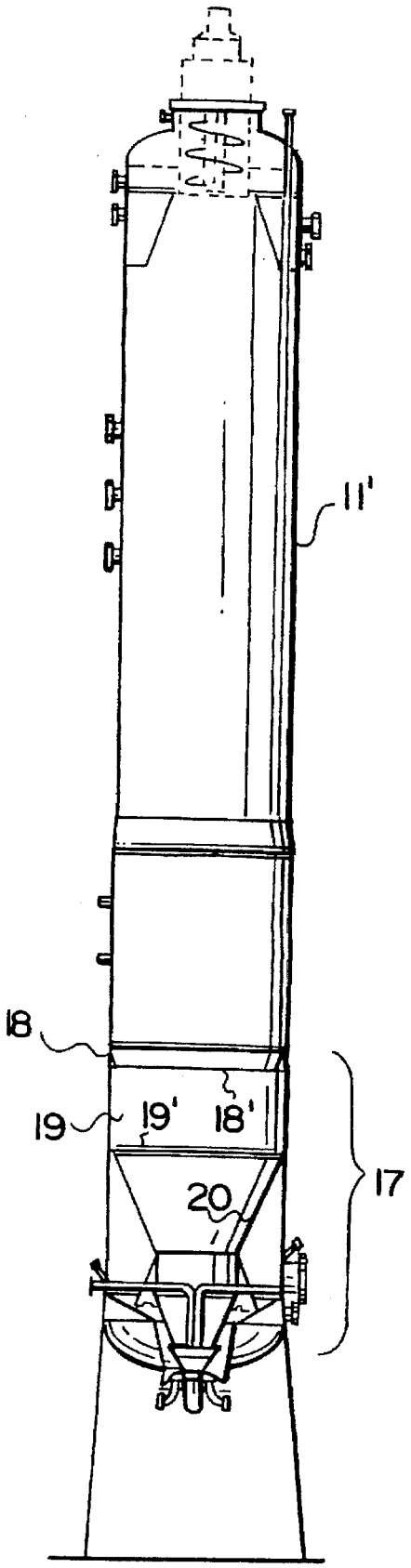
FIG. 4 is an exemplary impregnation or pretreatment vessel illustrating one embodiment oft he present invention.

One embodiment of the present invention as it is applied to an impregnation vessel 11' is illustrated in FIG. 4. FIG. 4 illustrates a typical application of a single-convergence transition 17 to the discharge of the impregnation vessel 11'. Though FIG. 4 illustrates a typical retro-fit of a single-convergence transition 17 to an existing impregnation vessel 11', this design is also applicable to a new vessel. The particular installation shown in FIG. 4 includes an initial conical transition 18 followed by a multiple, single-convergence transition/outlet 17. The transition/outlet 17 has a first transition portion 19 and a second transition portion 20 (also seen in FIG. 5).

Figure 5:
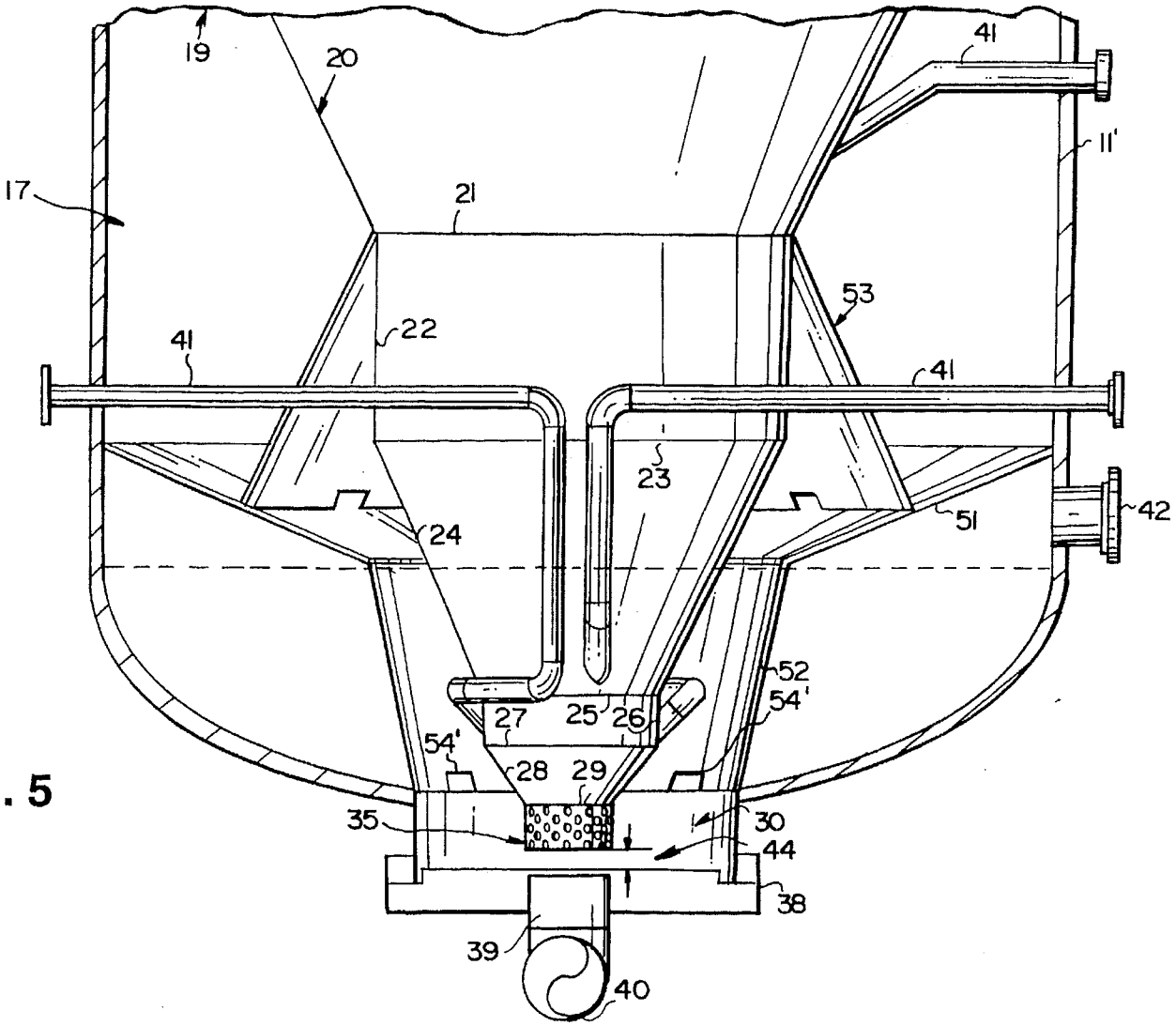
FIG. 5 is a detail cross-sectional view of the bottom of the vessel of FIG. 4.

FIG. 5 shows in detail the impregnation vessel 11' multiple single-convergence outlet 17 shown in FIG. 4. The transition 17 includes a single-convergence transition portion 19 (see FIG. 4), from a circular cross-section 18' (see FIG. 4) to an obround (or race-track oval) cross-section 19' (see FIG. 4). A second single-convergence transition portion 20 reduces the vessel dimension from an obround at 19' to a circular section at 21. The transition sequence is then repeated via a single-convergence transition portion 22 to an obround cross-section 23, and from obround 23, via single convergence transition portion 24, to a circular cross-section 25. This sequence again repeats via single-convergence transition portion 26, to an obround 27, and from obround 27 to a circular cross-section 29 via transition 28.

The transition 17 discharges, via a perforated (screen) cylindrical conduit 35, into a sluicing section 30. The bottom of conduit 35 is preferably vertically spaced from outlet 39 a distance 44 (e.g. about three inches). The sluicing section 30 receives liquor via the two or more liquid-introducing nozzles 42, and openings 54', to reduce the solids consistency of the impregnated chip mass and "sluice" the impregnated chips through the outlet 39. The outlet 39 is located in a flange 38 which caps the bottom of the vessel 11'. The impregnated chips discharged through outlet 39 pass through a conduit 40 under pressure to the digester 12 (as seen for the prior art system of FIG. 1). The discharge of the chips is aided by the introduction of additional sluicing liquor to the outlet/transition 17, e.g. by means of one or more conduits 41 directed, for example, to transitions 24 and 26, and/or by means of conduit 41' to transition 20. The sluicing liquor, which is typically bottom circulation return flow from the digester 12, in conduits 41, 41' preferably enters the transitions, for example transitions 20, 24, 26, etc., at a downward angle to promote downward flow of chips.

Though not required for new installations, the retro-fit of FIG. 5 of an existing vessel uses existing support baffle 51 and existing baffle support 52 (see FIGS. 2 and 5), and a new support skirt 53, to support the retrofitted/transition outlet 17. For new installations different supports my be used to effect the same result.

A detail of the outlet components 38–40, etc. is shown in FIGS. 6A and 6B. FIG. 6A shows a cross-section of the outlet 39 and the horizontal conduit 40. Also shown is the capping flange 38 and an additional dilution nozzle 43 into which sluicing liquid is introduced for sluicing the slurry to the digester 12. FIG. 6B shows a bottom view of components 38–40 and 43 of FIG. 6A.

Figure 7A:
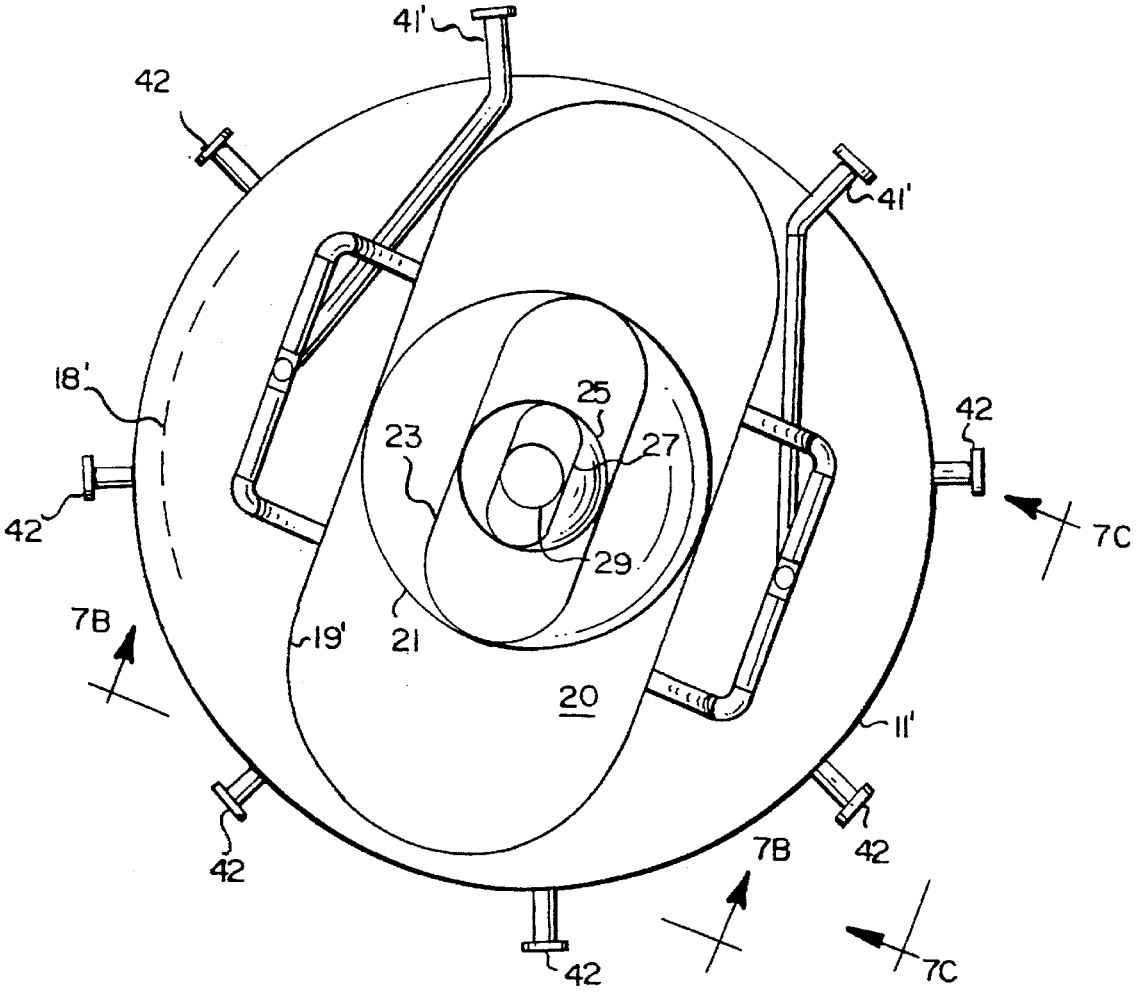
FIGS. 7A, B and C are detailed top, front and side views of the transition for the vessel shown in FIGS. 4 and 5, with the top removed for clarity of illustration.
Figure 7B:
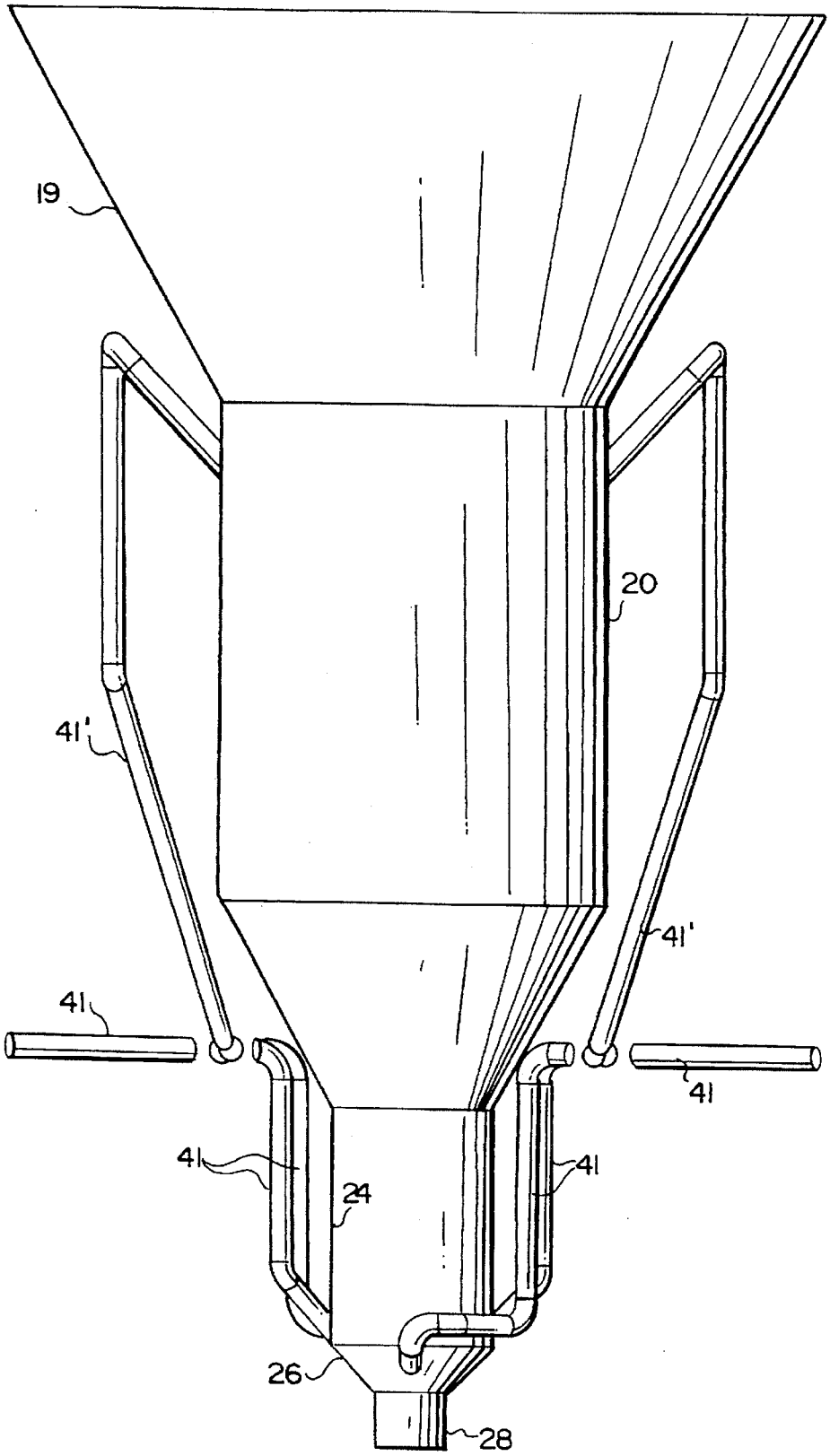
Figure 7C:
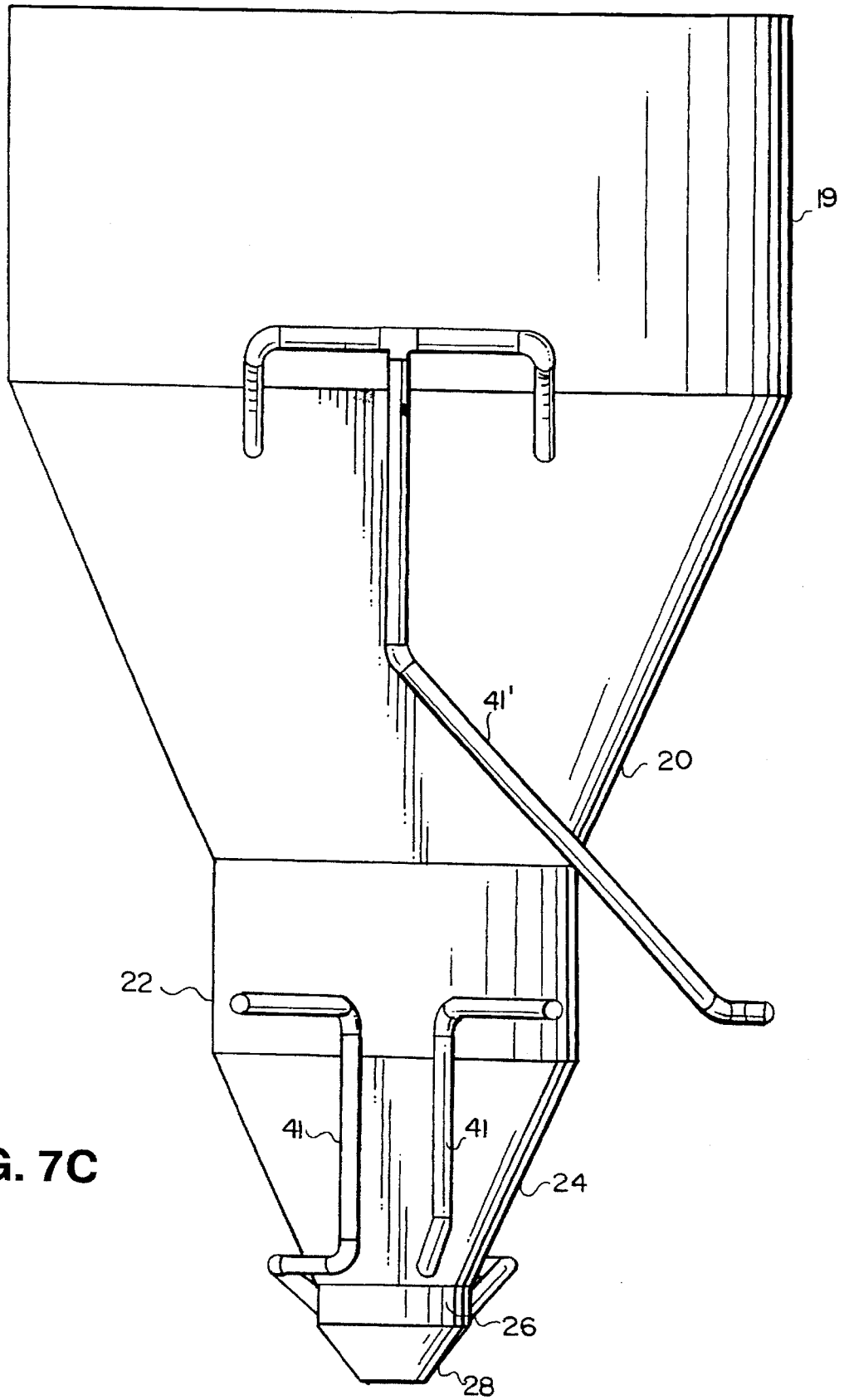

FIG. 7A is a top plan view of the transition shown in FIGS. 4 and 5, with the top of the vessel 11' removed for clarity of illustration. Similarly, FIGS. 7B and C show a front and side view, respectively, of the transition shown in FIG. 7A and are provided to illustrate details of the piping interfaces to the transition, and in particular shown how conduits 41 and 41' connect to the transition. FIGS. 7A to C illustrate one possible configuration for the dilution lines 41' to transition 20. Also shown are the respective circular and obround cross-sections 18', 19', 21, 23, 25, 27, and 29 of FIGS. 4 and 5, as well as typical dilution liquid addition nozzles 42.

Figure 8:
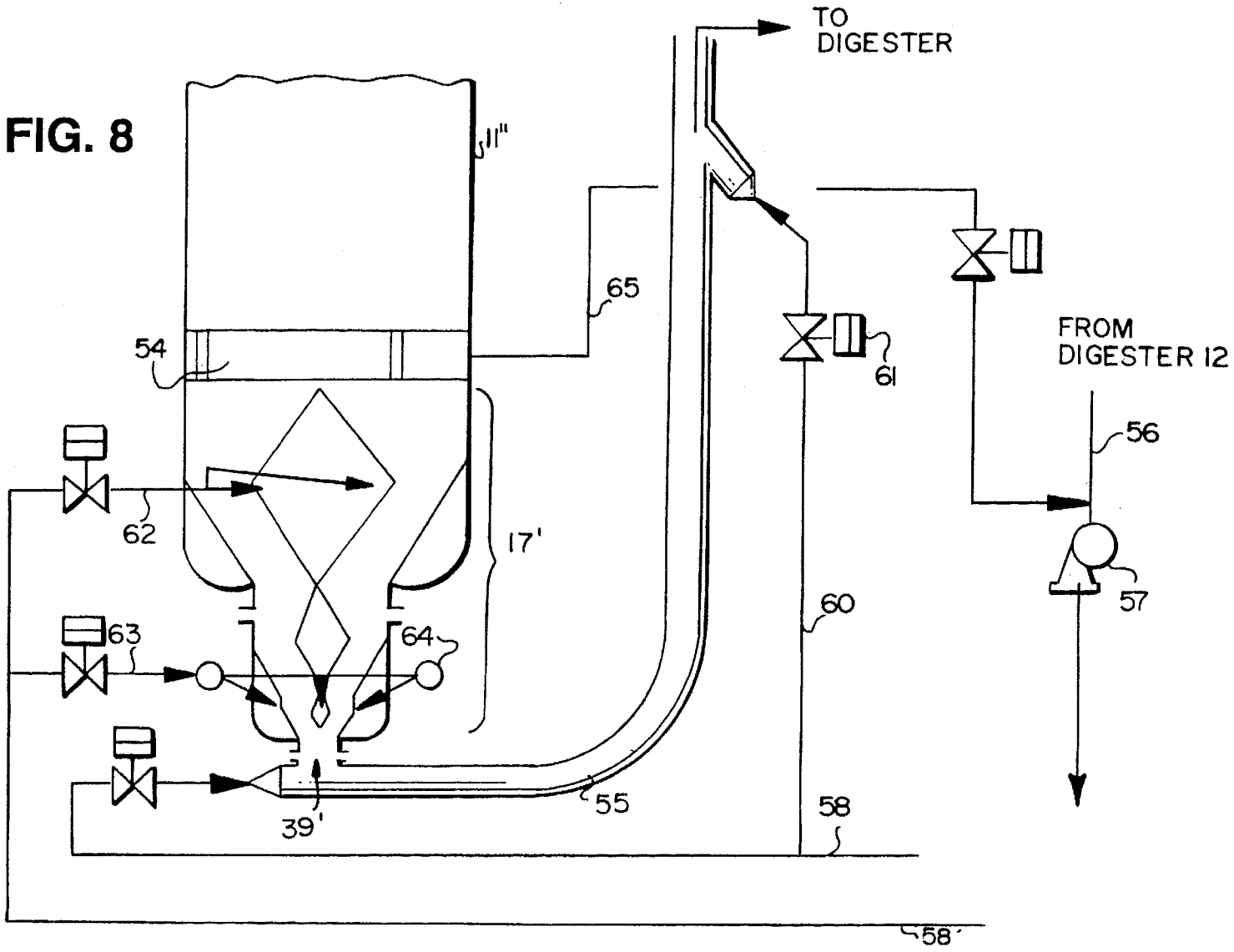
FIG. 8 is a schematic view like that of FIG. 5 only showing a further embodiment of the vessel of the invention.

An example of some of the piping that may be used around the transition 17 shown in FIGS. 4 through 7 is shown in FIG. 8. In FIG. 8, impregnation vessel 11" includes a multiple transition DIAMONDBACK™ outlet/transition 17', with an extraction screen 54 located above the transition 17'. The transition 17' discharges to an outlet 39' similar to the outlet shown in FIG. 6A, which communicates with a conduit 55 which directs pretreated or impregnated chips to a digester 12.

The liquor extracted from the chips entering the digester 12 is returned to the outlet of the impregnation vessel 11" by means of what are called "bottom circulation" or "BC" lines 56. The BC pump 57 transfers liquor extracted form the top of the digester 12 to dilution lines 58, 58'. The lines 58, 58' add dilution liquor, before or after it has been heated in conventional indirect heaters (see 59 in FIG. 1), at various locations to aid in the discharge of chips from the impregnation vessel 11" or aid in the slurrying of chips to the digester 12. Dilution liquid may be added to line 55 via line 60 and valve 61. Dilution liquid may also be added at various levels of the transition 17', for example at 62 or 63. These dilutions may be introduced by means of distribution headers such as header 64. Dilution liquid may also be added at the discharge 39' to aid in slurrying chips to the digester 12.

The extraction screen 54 may be used to regulate the direction of flow of liquor in the transition 17' or to regulate the consistency of the slurry entering the transition 17'. This extraction, along with the dilution flows 62, 63, etc. may also be used to control the level of chips in the impregnation vessel 11". For example, increasing the dilution flow to 62 and 63, will increase the flow of chips out of the vessel 11" and thus reduce the chip level; increasing the extraction flow out of screen 54 will restrain the chip column and tend to raise the chip level in the vessel 11". The liquor extracted at 54 may pass through a conduit 65 and be introduced to the BC flow 56, or sent to recovery or used as pretreatment for the incoming chips.

The invention shown in FIGS. 4 through 8 as it applies to an impregnation or pretreatment vessel 11', 11" may also be applied to a batch or continuous digester (12) or any other vessel in the pulp mill from which cellulose material is discharged. Also, though three double-transition, single-convergence transitions are shown, any number of transitions may be used depending upon the tonnage, types of treatment, and process conditions.

The vessels 11', 11" requires a relatively modest reduction from a vessel diameter of 5 to 15 feet down to an outlet diameter of 0.5 to 2 feet. For example, for the specific design shown in FIGS. 4–8 the vessel 11', 11" has a diameter of 12 feet and the transition 17 results in 1-foot circular diameter outlet opening. The angle of each single-convergence transition is in the range of about 20 to 30 degrees. In this particular design, three sets of single-convergence transitions were required to achieve the desired outlet diameter. However, if larger reductions in diameter are required another transition geometry may also be used.

FIGS. 9–12 illustrate the general geometry of a vessel transition that can be used when the reduction is greater than that which is shown in FIGS. 4 through 8. The transition 70, shown in FIGS. 9–12, is a "low-profile, anti-bridging cone", and converges from a first diameter 71 to a second diameter 72 at a much greater angle 73. The angle 73 is greater than that used in the transitions 17, 17' shown in FIGS. 4 through 8 and may range from about 30 to 45 degrees, or even higher. Thus, much larger reductions in flow diameter can be achieved with the geometry of the low profile anti-bridging cone 70 than with the transitions 17, 17'.

The transition 70 shown in FIGS. 9–12 consists of a conical section 74 split by two or more troughs 75 into two or more sections. The troughs 75—which physically may consist of the two halves of a lo pipe or cylinder split longitudinally—act to relieve the compressive forces present in the cellulose material mass to prevent bridging of the material across the transition 70. The conical section 74 discharges to the top of a smaller cylindrical section 76. The troughs 75 discharge to the bottom of the smaller cylindrical section 76.

Figure 9:
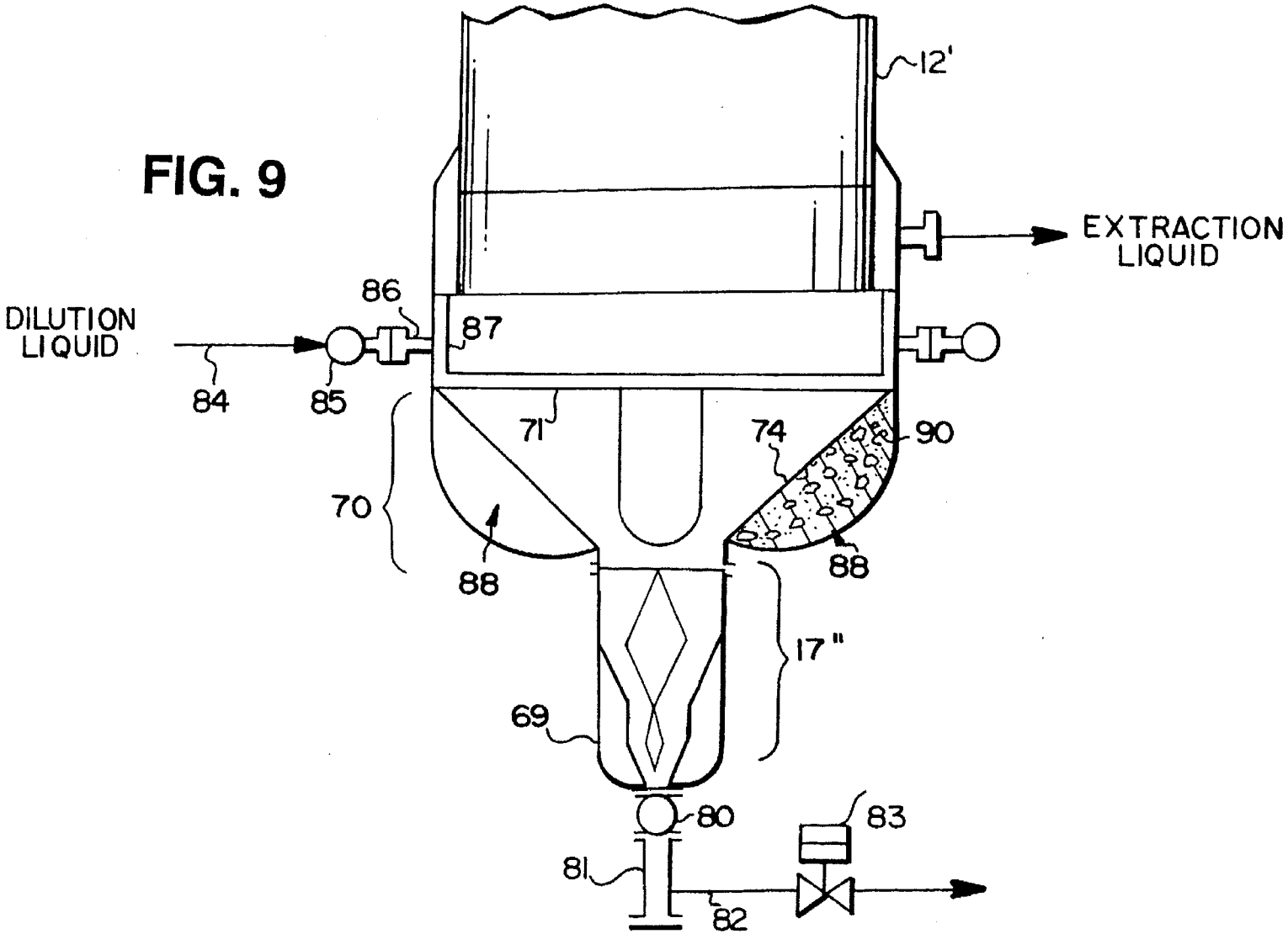
FIG. 9 is a schematic view like that of FIG. 5 only showing a still further embodiment of the vessel of the invention.
Figure 10:
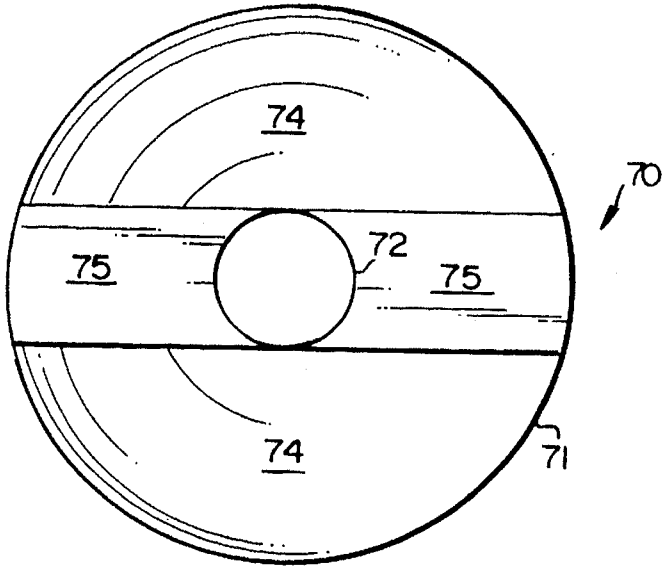
FIGS. 10–12 are top, elevational, and side views, respectively, of the anti-bridging cone per se of the embodiment of FIG. 9.
Figure 11:
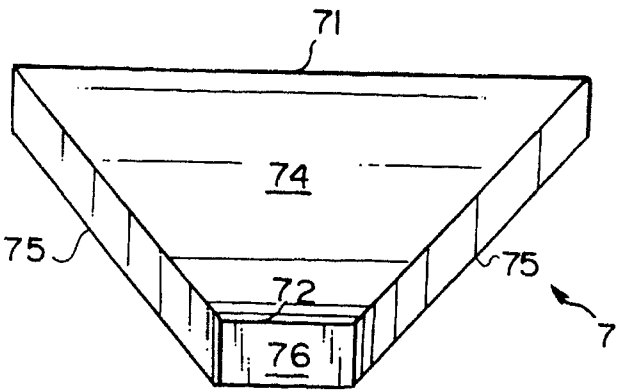
Figure 12:
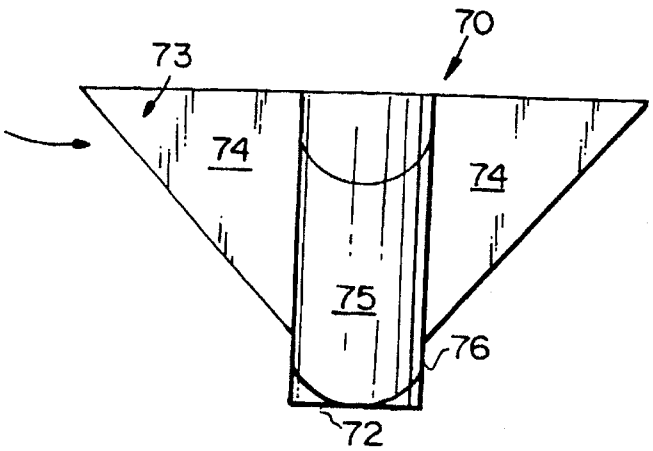

Though this type of transition 70 can be used for any type of cellulose treatment vessel, it is particularly advantageous for use in an impregnation vessel or digester like those shown in FIG. 1. For example, FIG. 9 schematically illustrates a typical installation for a digester 12'. The digester, 12' utilizes the anti-bridging cone 70 to discharge to a multiple, single-convergence, transition, 17". The transition 17" discharges through a main shut-off valve 80 to a discharge pipe 81, and conduit 82. The flow out of the digester 12' is controlled by blow flow control valve 83. The cooked pulp may pass downstream to further treatment, such brownstock washing, non-chlorine bleaching, etc.

To aid the discharge of pulp, dilution liquor may be added by way of a conduit 84 to a distribution header 85 which distributes liquor to nozzles 86. The incoming liquor impinges against a cylindrical baffle plate 87, which uniformly distributes the dilution liquid around the inside of the digester 12' shell and directs it to flow uniformly down the initial conical transition 74. The voids 88 beneath the transition 74 may be filed with concrete or other filler material (as illustrated at 90 in the right half of FIG. 10) to add support to the transition and fill dead place. If desired this void space 88 may also be used to add dilution liquor to selected areas of the transition 74. The voids 69 below the DIAMONDBACK™ transition 17" may be fill ed or used in a similar fashion.

The digester 12' may also include an extraction screen to aid in the controlling of the pulp consistency and to control the direction of liquor flow in the region at or near the outlet of the digester.

As noted earlier, the low-profile, anti-bridging cone 70 may also be used in a similar fashion for an impregnation vessel, or any similar type vessel in the pulp mill from which cellulose material is discharged. Also, similar to the single-convergence design shown in FIGS. 4 through 8, more than one low-profile, anti-bridging cone 70 may be used, with one or more single or multiple, single-convergence outlet, 17, 17', 17". Furthermore, though the illustrations used exclusively show the use of these discharge geometries at the bottom of down-flow vessels, these outlet geometries may also be used at the top of up-flow vessels, and in interpreting the terms "top" and "bottom" of the specification and claims this general equivalency should be kept in mind.

The inventions described above present novel methods and devices for eliminating the need for mechanical agitators for discharging comminuted cellulose material from treatment vessels; when mechanical agitators are eliminated, maintenance is drastically reduced, and the potential for damaging the material is minimized.

Figure 13:
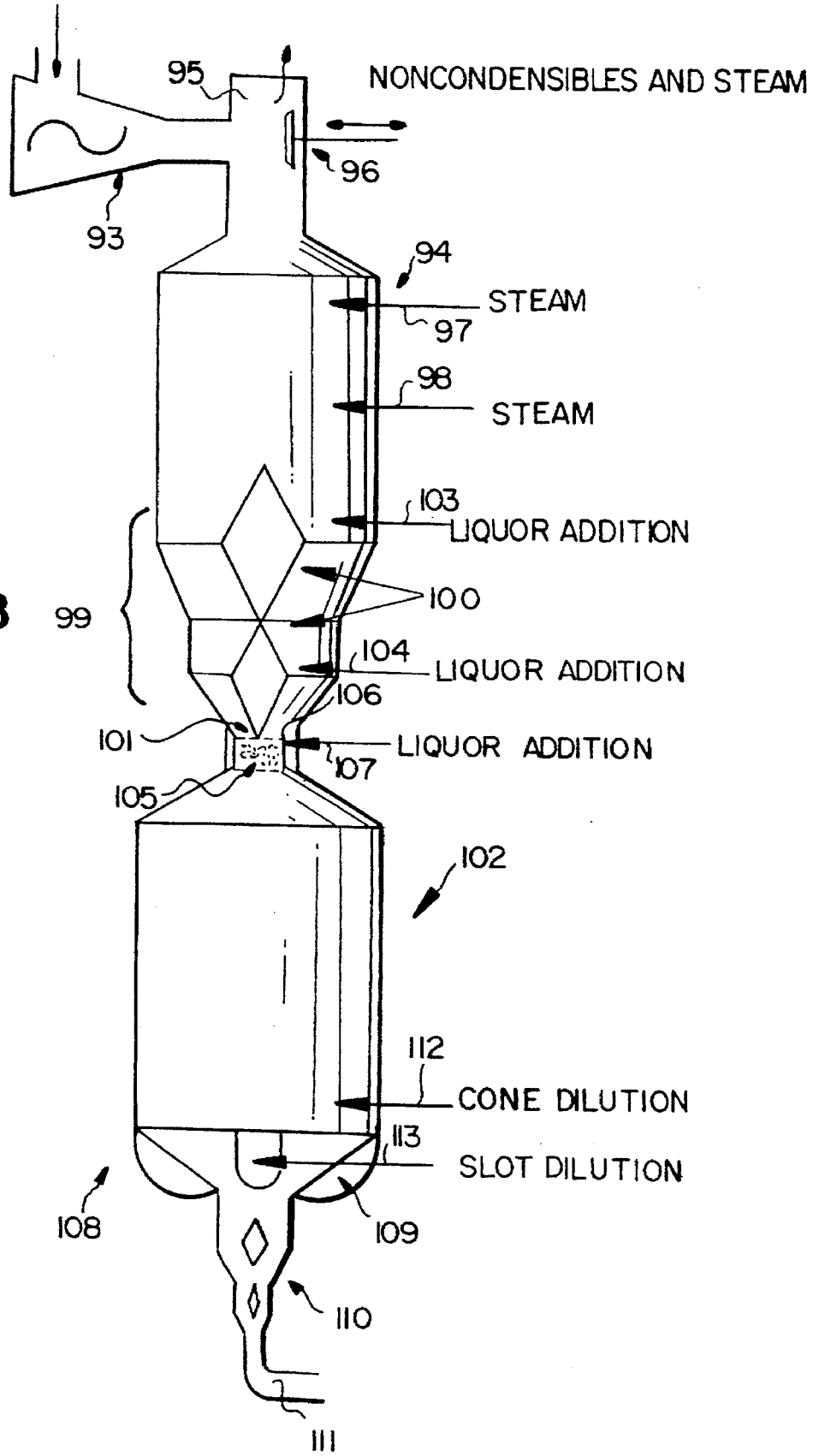
FIG. 13 is a schematic view showing another embodiment of an exemplary pulping system according to the present invention.
Figure 14:
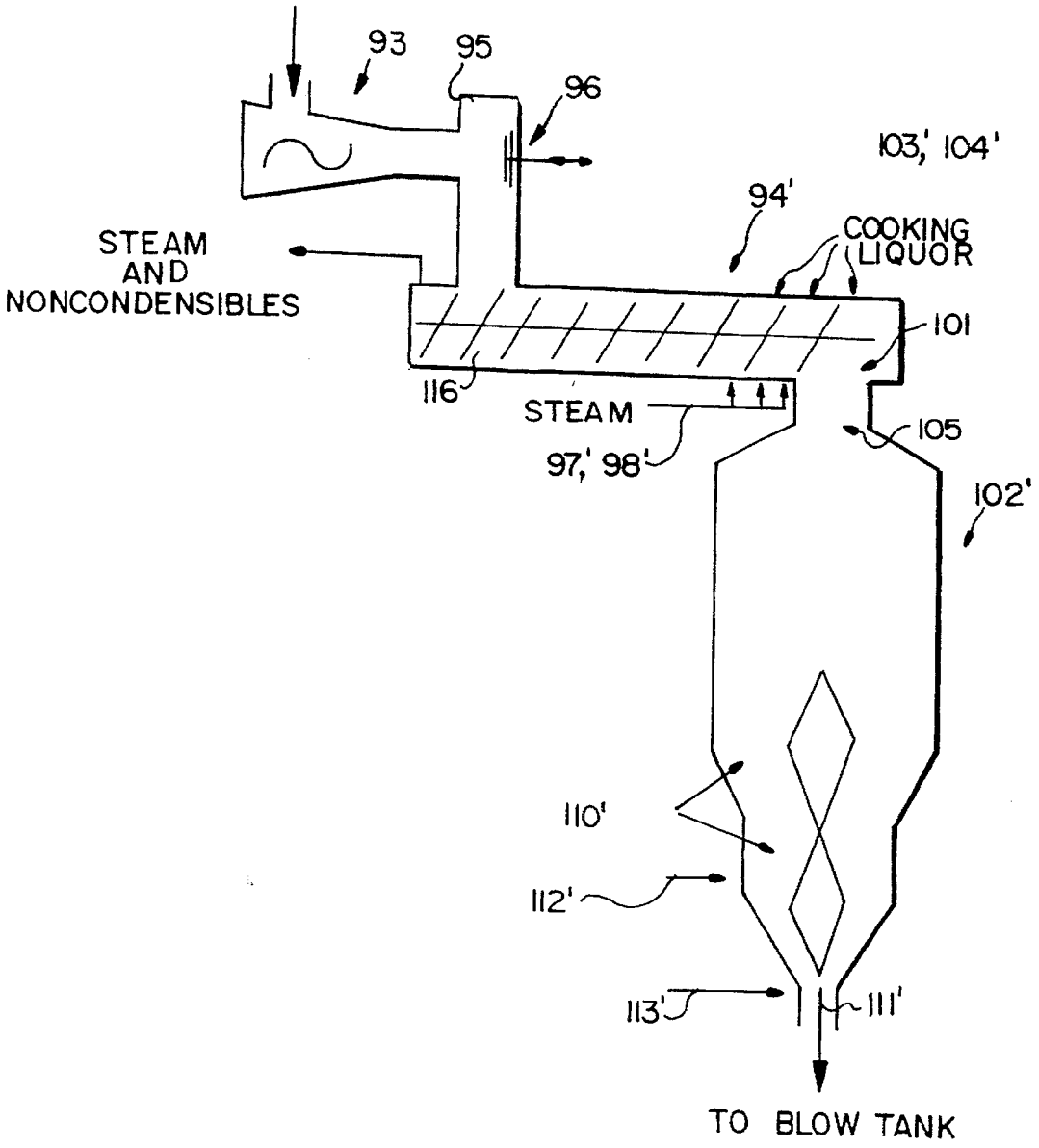
FIG. 14 is a view like that of FIG. 18 showing an alternative construction of the pulping system.

FIGS. 13 and 14 show pulping systems according to the present invention for treating cellulosic material that is easier to impregnate such as hardwoods, eucalyptus, sawdust or non-wood cellulosic fibrous materials. Non-wood fiber sources include easily impregnable fibers, such as bagasse and cornstalks, among others, to effect digestion thereof. The pulping systems of FIGS. 13 and 14 do not require an impregnation vessel because these fibers are easier to impregnate and cook.

FIG. 13 shows a feeding means 93 for feeding the generally vertical steaming vessel 94. The bagasse, sawdust, or like material may be fed directly to the feeding means 93 from a conveyor or the like, but preferably is first steamed in a cellulose material bin. Such a bin is described in co-pending application Ser. No. 08/366,581 filed Dec. 30, 1994.

The feeding means 93 may—as schematically illustrated in FIG. 13—comprise a plug screw feeder. Other feeding means include a RING® press available from Kamyr, Inc. of Glens Falls, N.Y., an inclined screw conveyor, a pocket feeder, or a like device which feeds with isolation between its inlet and the pressurized steaming vessel 94. The screw feeder 93 forms a plug at its outlet which effects a seal.

The vertical steaming vessel 94 is typically cylindrical, having a generally circular cross-section, and has a vent 95 for the vent of non-condensible gases and steam. A conventional blow back control device, illustrated schematically at 96 in FIG. 13, is provided in the vent 95. Typically the blow back control device 96 is a reciprocating piston, although other conventional mechanisms may be utilized. The blow back device 96 ensures that if an effective seal is not provided between the feeding means 93 and the pressurized steaming vessel 94 the blow back of pressurized gases from the interior of the vessel 94 to the feeding means 93 does not occur.

Means are provided for adding stem to the vessel 94 such as conventional headers, nozzles, conduits, and the like. For example as schematically illustrated at 97 and 98 in FIG. 13 steam may be added at various levels of the vessel 94.

The bottom section 99 of the vessel 94, from which discharge of the steamed cellulose material will be effected, preferably includes no moving mechanical elements which contact the cellulose material. For example as schematically illustrated at 100 in FIG. 13, the discharge section 99 may comprise a single-convergence geometry of either the DIAMONDBACK™ type, or the slotted cone type (like the structure 70 illustrated in FIGS. 9 through 12). As illustrated in FIG. 13 the discharge transition 100 comprises a hollow transition having a first, uppermost, portion having a generally right rectangular lo parallelepiped configuration including opposite side faces having generally triangular shapes, and providing one dimensional convergence and side relief; a second portion tapering from a generally rectangular parallelepiped configuration at an upper part thereof to a generally circular configuration at a lower part thereof and having opposite side faces having generally triangular shapes which align with said first portion generally triangular shapes to define substantially diamond shaped wall portions; a third portion substantially the same as said first portion, only smaller, and connected to said second portion lower part; and a fourth, lowermost, portion substantially the same as said second portion only smaller, and connected to said tigard portion in the same manlier as said second portion is connected to said first portion, connected to an outlet 101 for steamed material from the vessel 94. The structure 100 as described above is the same as that disclosed in co-pending application Ser. No. 08/366,581 filed Dec. 30, 1994, to which attention is directed.

In FIG. 13 the outlet 101 for steamed material is shown mounted directly above a digester 102, and cooking liquor may be added in the section 99, as indicated by lines 103, 104, at different levels. While the system illustrated in FIG. 13 is simple, other direct connections between the vessels 94, 102 may be provided, such as by providing the vessel 102 essentially next to the vessel 94 and providing a conduit therebetween (with or without a pressurizing pump).

In the embodiment illustrated in FIG. 13, the outlet 101 is essentially the same as the inlet 105 at the top of the vertical digester vessel 102. In this embodiment a perforated cylinder 106 is provided at the outlet 101/inlet 105, and dilution liquor may be added to the material flowing through the outlet 101/inlet 105 by adding the liquor as indicated at 107 to the outside of the annulus defined by the perforated cylinder 106, the liquid (typically cooking liquor at cooking temperature) flowing through the perforations in the cylinder 106.

The digester 102 has discharge means adjacent the bottom 108 thereof. The discharge means—shown schematically by reference numerals 109 and 110 in FIG. 13—cause the pulp to flow without hangup and without the necessity of bringing any moving mechanical element into contact therewith. That is the vessel 102 is devoid of moving mechanical elements which come into contact with pulp to facilitate discharge of the pulp from the pulp outlet 111. The discharge means 109 is a low profile anti-bridging cone such as the structure 70 illustrated in FIGS. 9 through 12, while the discharge means 110 comprises a series of single-convergence transitions with side relief, such as the transitions 17, 17', 17", and described above with respect to the transition 100. Only one of the discharge transitions 109, 110 may be provided in any particular situation, or modified forms thereof may be provided, any suitable structure that provides anti-bridging flow of the pulp through the outlet 111 without the necessity of mechanical elements may be utilized. In the digester 102—as in the digester 12' illustrated in FIG. 9—dilution liquid may be added to facilitate discharge through outlet 111, for example dilution liquid may be added at the points 112, 113 illustrated in FIG. 13.

FIG. 14 illustrates a modified form of the pulping system of FIG. 13. In FIG. 14 structures identical to those in FIG. 13 are shown by the same reference numeral. Structures merely comparable are shown by the same reference numeral only followed by a "'".

The main difference between the steaming vessel 94' and the steaming vessel 94 is that the vessel 94' is a conventional horizontal steaming vessel, having a rotating screw 116 mounted therein. Steam addition is at 97', 98', and cooking liquor addition at 103', 104'. The outlet 101/inlet 105 may be as illustrated in FIG. 13, or the perforated cylinder 106 can be eliminated (as seen in FIG. 14).

The vessel 94' may also be an inclined screw conveyor containing a liquid level such that the cellulose material, e.g., sawdust, is immersed in liquor prior to existing the vessel.

The digester 102' is the same as the digester 102 except that in this particular embodiment a series of transitions having one dimensional convergence and side relief, 110', only are provided, and cold blow dilution liquid to facilitate discharge from the vessel 102' may be added at 112', 113'.

Figure 15:
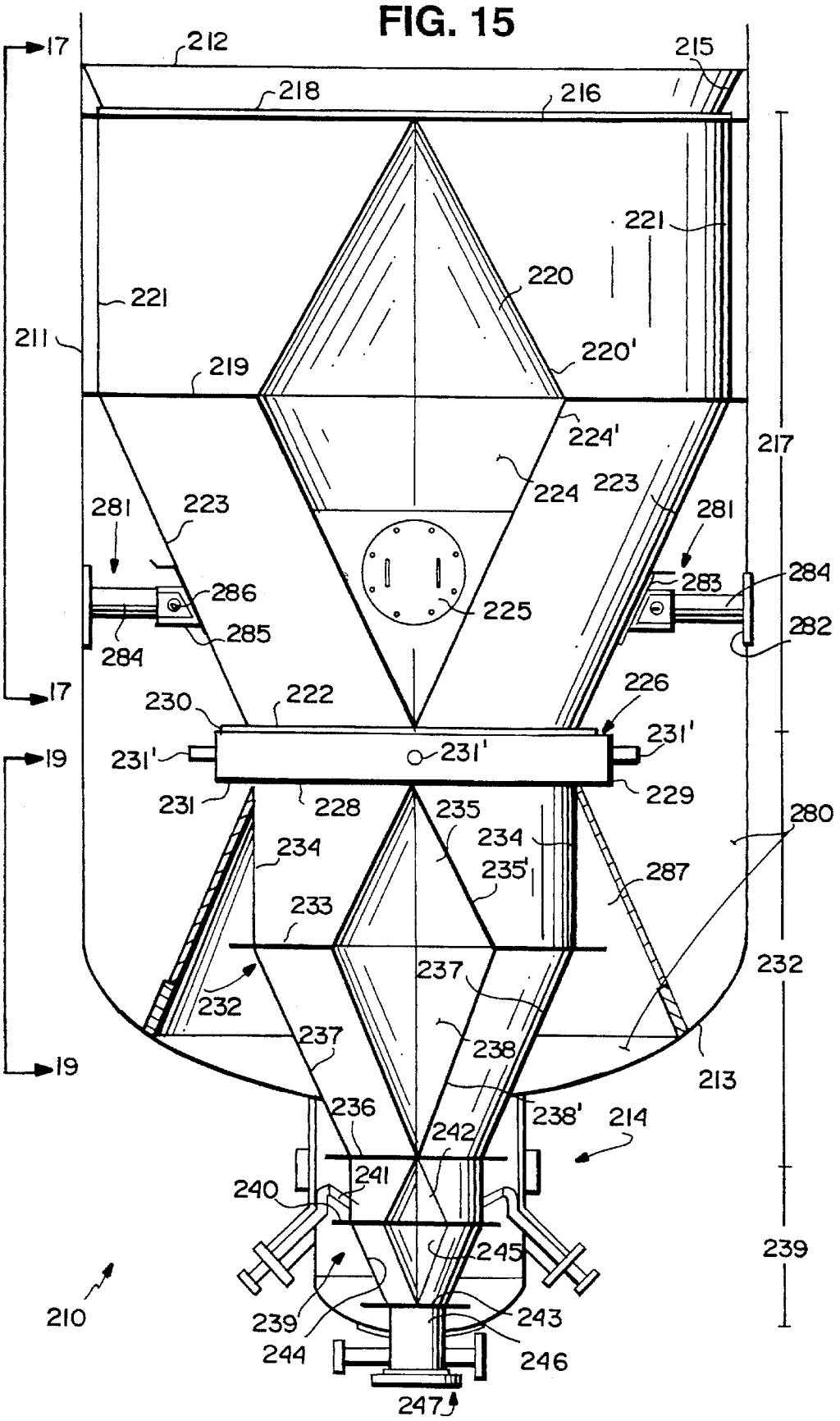
FIG. 15 illustrates a cross-sectional elevation view of the modification of an existing digester outlet according to the invention.

In the FIG. 15 embodiment the outlet design 210 that replaces the conventional outlet, generally shown in FIG. 3. The outlet is installed into the existing cylindrical digester shell 211 having a diameter 212, a hemispherical head 213, and a lower outlet chamber 214. Though the invention shown is for the modification of an existing digester, it is understood that a similar design can also be used in a new digester.

The outlet 210 initially includes a short conical transition 215 which converges from the existing first circular cross-section 212, corresponding to the digester shell 211, to a second smaller cross-section 216 (shown in phantom) which discharges material within the first section 217 of the outlet 210. The transition section 217 has a third circular cross-section 218 which converges by means of single-convergence and side-relief to a first obround, or race-track-oval-shaped, cross section 219 and then to a fourth circular cross-section 222.

The major diameter of the obround section 219—which has a generally right rectangular parallelepiped configuration (with rounded ends) as described above with respect to the discharge transition 100—may be essentially the same as the diameter of cross-section 218 or it may converge slightly such that the major diameter of obround section 219 is less than the diameter section 218. This convergence may be provided to accommodate an existing vessel design or to facilitate the installation of the outlet. If the major diameter of section 219 is less than the diameter of section 218 it is preferred that the angle of convergence be less than the critical convergence angle for the material being transferred, for example, for wood chips this convergence angle should be less than approximately 10°. This single-convergence and side relief, as described in co-pending applications 08/189,546 filed Feb. 1, 1994 and 08/366,581 filed Nov. 1, 1994 (atty. dkts 10-926 and 10-1020, respectively), is achieved by generally triangular-shaped converging walls 220 and generally non-converging walls 221.

The outlet transition 217 continues by converging from the first obround cross-section 219 to a fourth circular cross-section 222. This is achieved by means of converging walls 223 and generally non-converging, generally triangular-shaped walls 224. One of the walls 224 may include a manway 225.

The outlet assembly may include a dilution or extraction box 226 having an inner cylindrical screen plate (not shown) having the same diameter as section 222 and an annular plenum (not shown). This plenum consists of an outer wall 229 and upper and lower annular plates 230 and 231, respectively, and one or more conduits 231' in liquid communication with the inside of the plenum 227. Liquid can be added by means of these conduits 231' and screen 226' to add chemicals, dilution liquid, or steam, or to aid in transferring the material through the transition 217. Liquid can also be removed by means of conduits 231' and screen 226'.

For example, extraction box 226 may be used to cool the hot chip mass flowing from a cooking zone above. For instance, cooler wash filtrate, or another source of cooler liquid, can be introduced to the chip mass in proximity to screens 226' using a centrally located pipe, or centerpipe. Then by using the screen 226' and conduits 231' the cooler liquid can be drawn radially through the chip mass to cool the chips before they are discharged. The cooler liquid may be introduced above or below the screens 226' so that the chip mass can be cooled either co-currently or counter-currently, respectively.

A second set of transitions exhibiting single-convergence and side-relief is generally shown at 232. The fourth circular cross-section 228 converges to a second obround cross-section (generally right rectangular parallelepiped with rounded ends) 233 by means of generally non-converging side walls 234 and generally triangular-shaped converging walls 235. The obround cross-section 233 then converges to a fifth circular cross-section 236 by means of converging side walls 237 and by generally triangular-shaped non-converging side walls 238.

A third transition is shown at 239 and consists of transition from the fifth circular cross-section 236 to a third obround (generally right rectangular parallelepiped with rounded ends) cross-section 240 by means of generally non-converging side walls 241 and generally triangular-shaped converging walls 242. The obround cross-section 240 then converges to a sixth circular cross-section 243 by means of converging side walls 244 and by generally triangular-shaped non-converging side walls 245. The lower transition 239 discharges to a cylindrical section 246 which discharges to an outlet assembly 247.

Though three sets of single-convergence transitions are shown, it is understood that the number of transitions may vary depending upon the application, including using only one set of transitions, or more than three.

Figure 16:
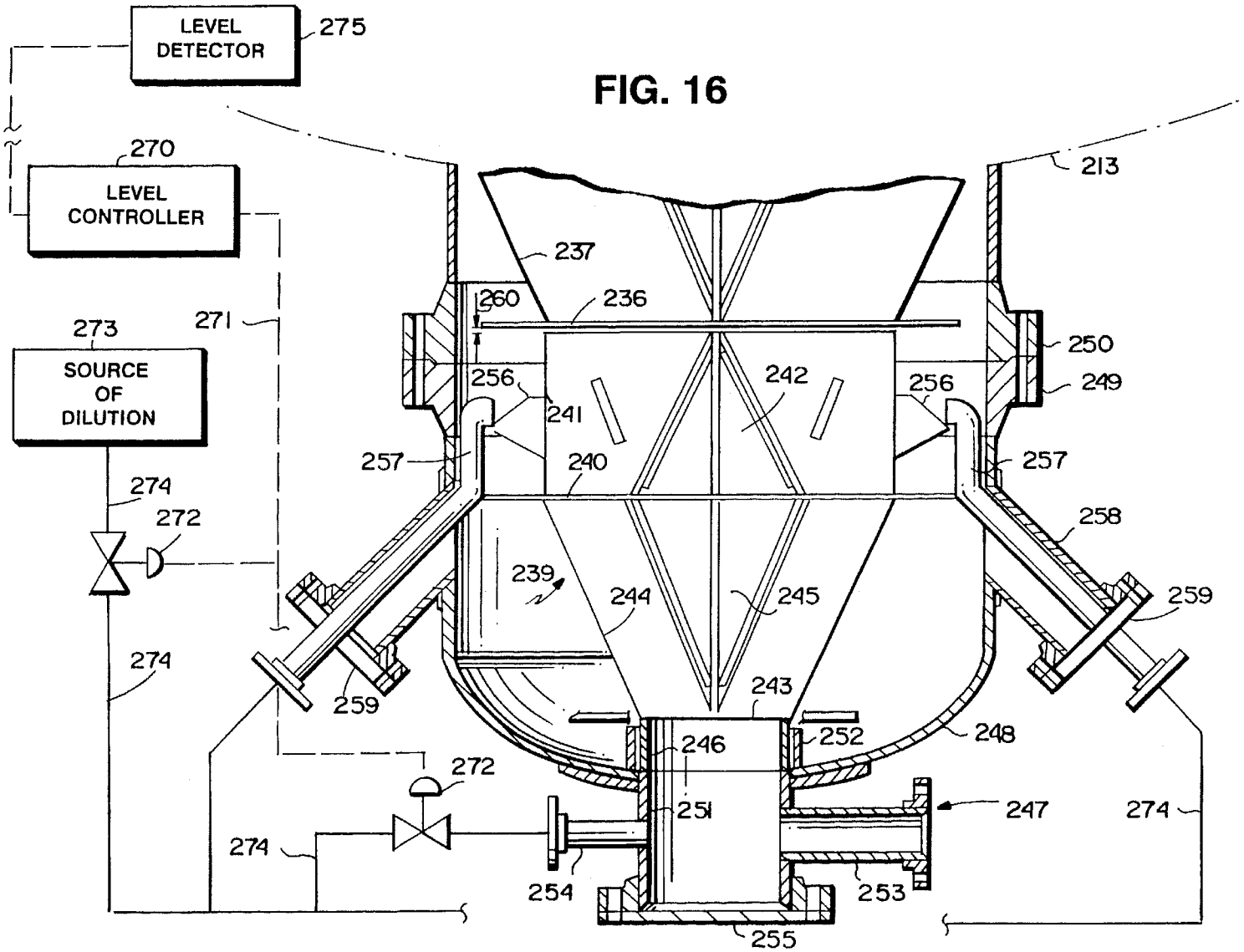
FIG. 16 is a detailed view of the outlet section according to the invention shown in FIG. 15.

A detail of the lowest transition 239 and the outlet assembly 247 appears in FIG. 16. FIG. 16 shows the lowest transition 239 mounted in an outlet shell assembly 248. The shell assembly 248 includes a mounting flange 49 which is bolted to the bottom flange of the digester shell 250 by means of bolts (not shown). The outlet assembly 247 consists of a vertical pipe 251 which directly communicates with the cylindrical section 246 of the outlet. Sections 246 and 251 may be rigidly fixed to each other, for example by welding, or may not be rigidly fixed but aligned by means of a cylindrical section 252 to facilitate assembly.

The outlet 247 also includes a horizontal pulp discharge conduit 253, which intersects conduit 251, for discharging treated material to a downstream process or to storage. The outlet may also include one or more conduits 254 for adding dilution or treatment liquids to the material slurry. The outlet pipe 251 is sealed by a blind flange 255.

FIG. 16 also shows that the connection between walls 237 and 241 may not be rigid but may include a gap 260. This gap is included to allow for thermal expansion between the sections 232, 239 and to facilitate the assembly of the outlet pieces.

The transition sections 217, 232 and 239 may also include nozzles for the addition of liquids for dilution or treatment. These nozzles may be rigidly mounted to the transition sections, for example by welding, or the nozzles may be installed with a clearance as shown in FIG. 16. In FIG. 16, dilution nozzles 256 are included in the non-convergent walls 241. These nozzles are fed by conduits 257 which are mounted in nozzles 258 which are sealed by flanges 259. Conduits 257 may be rigidly mounted to the flanges 259 to facilitate assembly and removal. A clearance is maintained between nozzles 256 and conduits 257 to permit the dilution or treatment liquid to supply the entire volume of the lower outlet 239. In this way liquid can also be added to the clearance 260 and to any other openings in the flow path. This distribution of liquid also aids in preventing the building-up of material, for example wood chips, that may accumulate.

Figure 17:
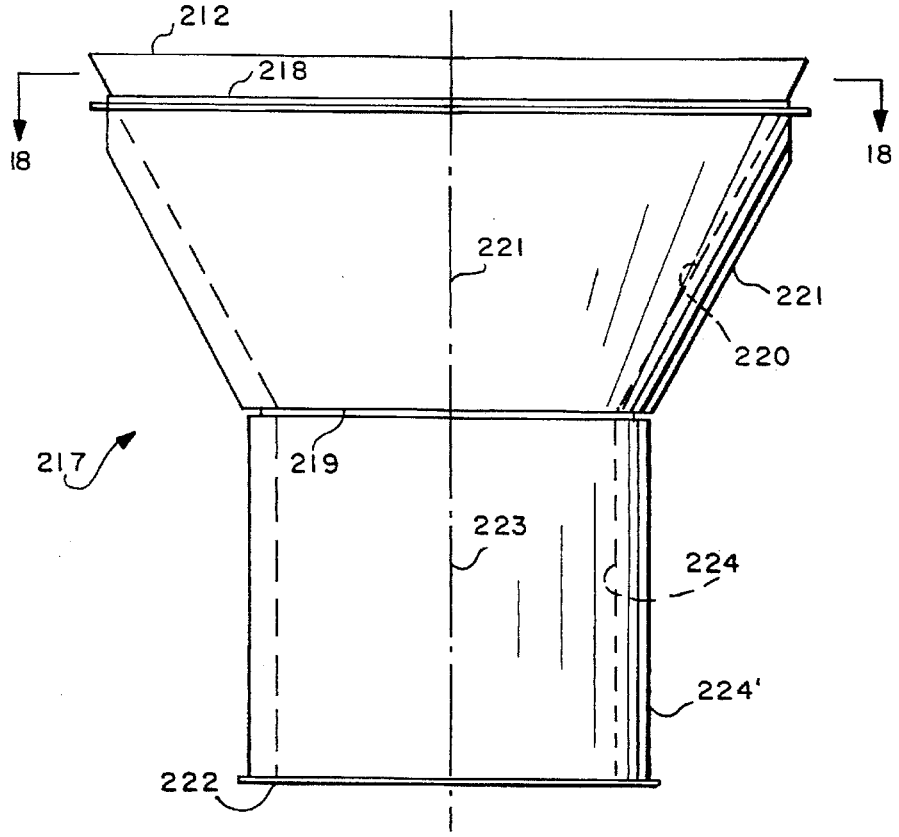
FIG. 17 illustrates a side view of the upper section shown by view 17—17 in FIG. 15.
Figure 18:
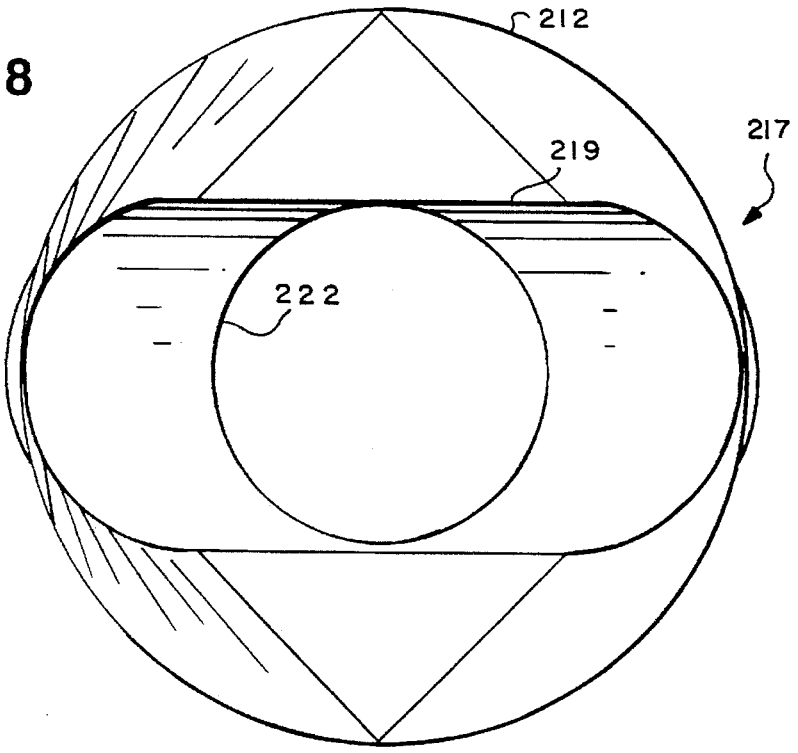
FIG. 18 illustrates a top view of the upper section as viewed from view 18—18 of FIG. 17.
Figure 19:
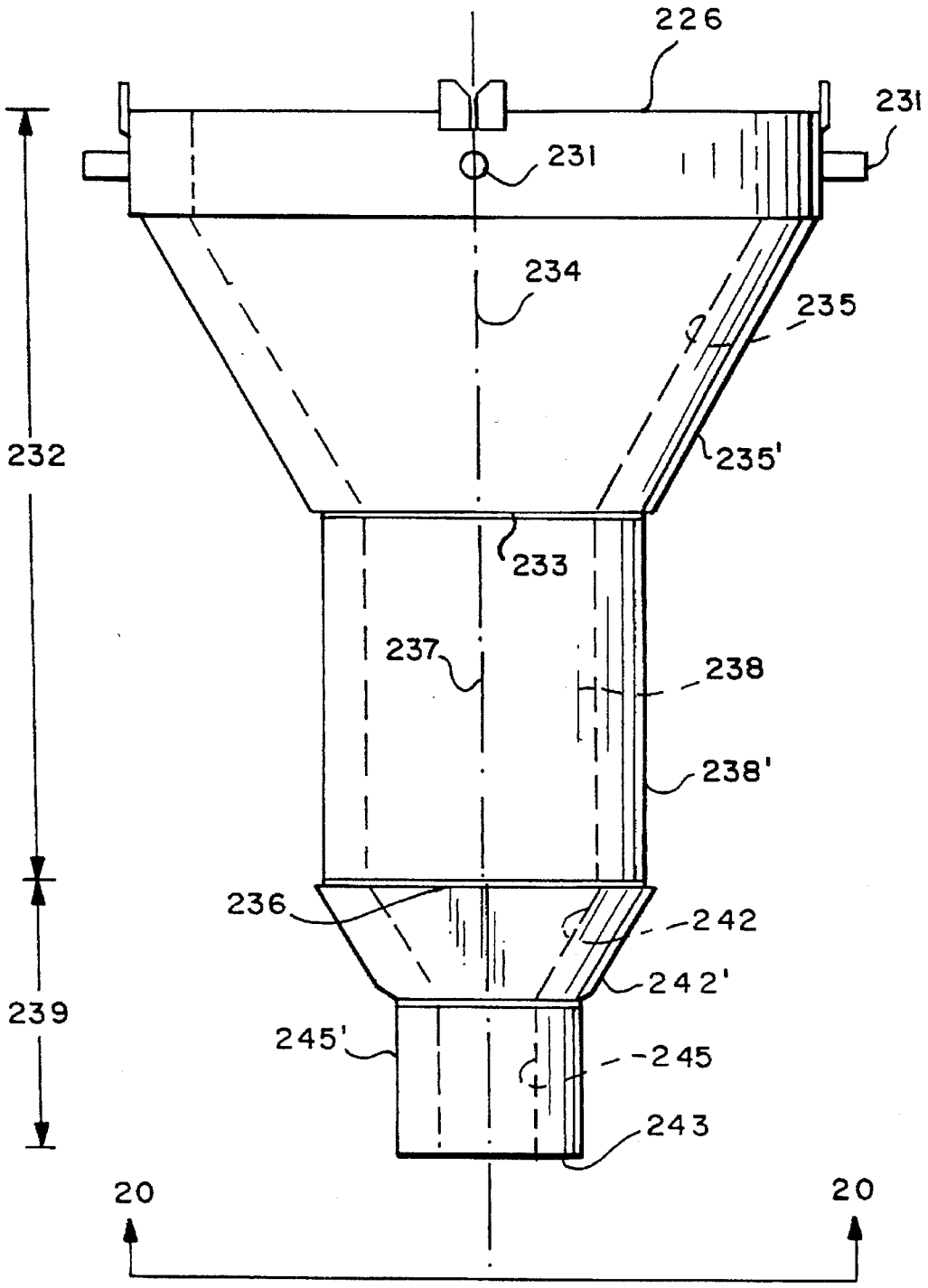
FIG. 19 illustrates a side view of the middle section and the lower section of the outlet as viewed from view 19—19 of FIG. 15.
Figure 20:
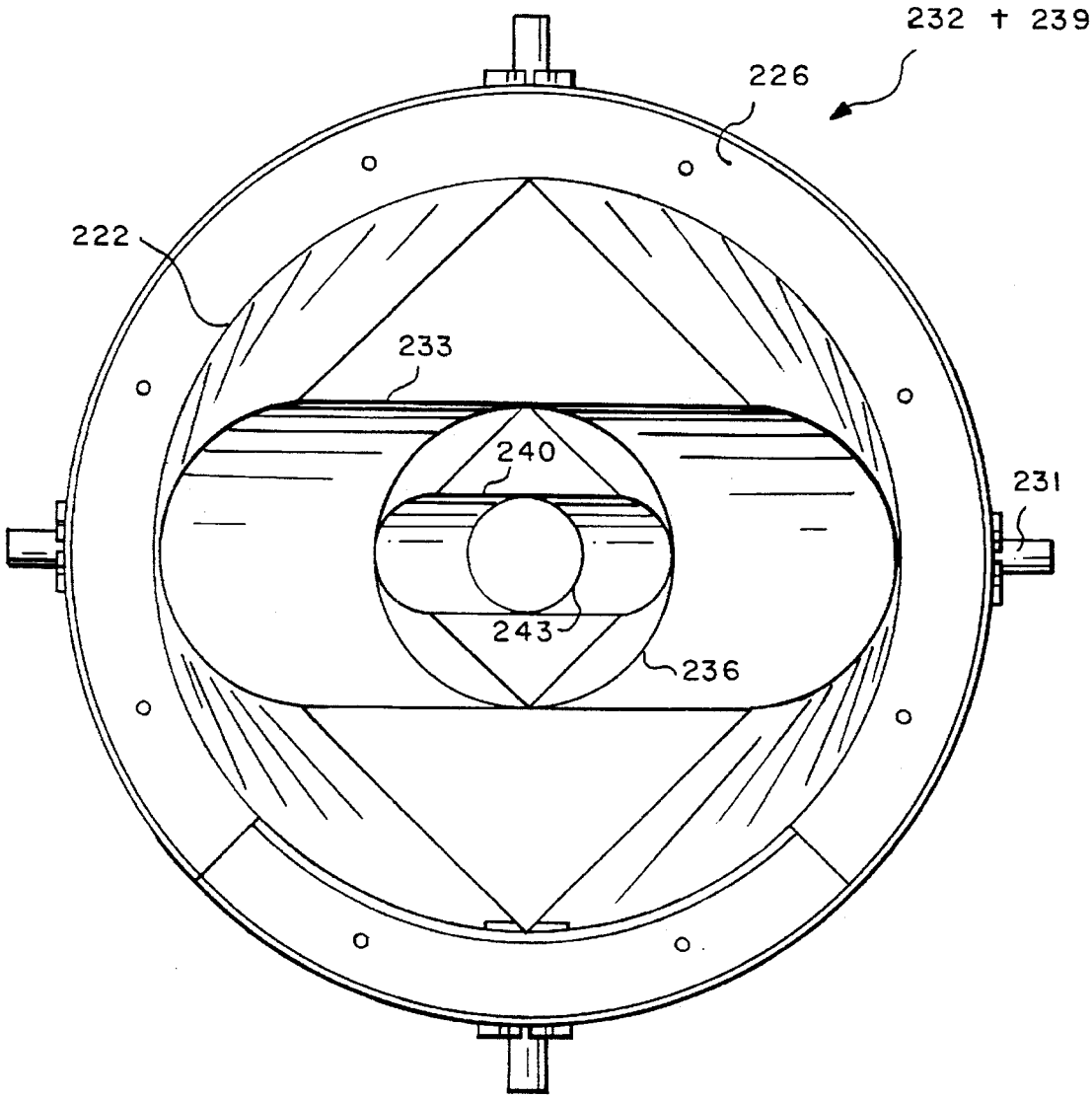
FIG. 20 illustrates a bottom view of the middle section and the lower section of the outlet as viewed from 20—20 of FIG. 19.

FIG. 17 illustrates a side view of the upper section 217 shown by view 17—17 in FIG. 15. FIG. 18 illustrates a top view of the upper section 217 as viewed from view 18—18 of FIG. 17. FIG. 19 illustrates a side view of middle section 232 and lower section 239 as viewed from view 19—19 of FIG. 15; and FIG. 20 illustrates a bottom view of middle section 232 and lower section 239 as viewed from the view 20—20 of FIG. 19.

FIG. 16 also illustrates a method of controlling the operation of a vessel (e.g. digester 210) with an outlet having single-convergence and side-relief. While this aspect of the invention is described with respect to digester 210, it is applicable to other pulp handling vessels. The flow of material out of such vessels, for example, chip bins, impregnation vessels, digesters or other treatment or storage vessels for comminuted fibrous material, is determined by the flow characteristics of the material. It has been found that the flow out such a discharge outlet can be varied by varying the amount of dilution liquid added at one or more locations in the outlet. As a result, it has been found that the discharge rate or the level of material in such a vessel can be controlled by varying the amount of dilution liquid introduced into the outlet.

FIG. 16 illustrates a typical method for controlling the level of material in such a vessel 211. The level of material present in the vessel 211 is determined by a conventional level detector shown schematically at 275, for example by means of electro-mechanical or piezoelectric devices, or gamma radiation or sonic detection, and this level is compared in computer controller 270 to a user defined preferred level. The controller 270 automatically determines whether is to increase or decrease the level and forwards a signal 271 to one or more dilution flow control valves 272. These valves control the flow of dilution from a source of dilution 273 to one or more dilution nozzles, e.g., nozzles, 254 and 257, by means of pipes 274. By employing such a method no control valves are required in the pulp discharge conduit 253 of the digester 211. The flow of material, and thus the level of material in the vessel 211, are simply controlled by the amount of dilution introduced to the outlet.

It will thus be seen that according to the present invention advantageous methods and apparatus (including vessels and systems) are provided, one of the major advantages of which is minimal degradation of the pulp or comminuted cellulosic material as a result of discharge from a vessel because no rotating, vibrating, or other movable mechanical elements are brought into contact with the pulp to effect discharge. Rather discharge is effected primarily by the geometry of the discharge portions of the vessels, and/or by the introduction of dilution liquid through nozzles, headers, conduits, or the like. The dilution liquid addition .typically reduces the consistency of the material somewhat to facilitate discharge, but normally the consistency of the material is maintained above five percent even after the addition of dilution liquid, and typically the consistency of the material during treatment is about 8–20%.

When the transitions 217, 232, 239, etc., are retrofit into an existing digester shell, the volume 280 (see FIG. 15) surrounding the transitions 217, 232, 239 may be filled with an inexpensive solid or semi-solid material (such as foam, concrete, or foamed concrete), as seen in the FIG. 9 embodiment at 90. Alternatively, or in addition, supporting structures may be provided. As seen in FIG. 15, for example, a plurality (e.g. at least two-four) of braces 281 may be provided between the inside of shell 211 and the converging walls 223, each brace 281 including a first metal plate 282 engaging the inner surface of shell 211, a second metal plate 283 contoured (e.g. curved) to engage a wall 223 along the length of plate 283, a metal support bar or rod 284 between plates 282, 283, and a transition collar 285 telescoping over bar or rod 284 and affixed thereto with a metal pin 286. The plates 282, 283 may be welded in place, or held in place only by the compression-resisting force applied by rod or bar 284 (i.e. wedged in place). The effective length of rod or bar 284 may be adjusted by providing holes therein (not shown) at different spacings for receipt of pin 286 extending through collar 285.

Further support for the transitions 217, 232, 239 is provided by the support element 287 which engages the extraction box 226 at the top thereof and the inner surface of head 213 at the bottom thereof. The element 287 is preferably a steel hollow truncated cone (as illustrated in FIG. 15), and may be referred to as a support skirt, and it may be continuous or discontinuous. Especially if discontinuous, conical support skirt 287 may be welded or otherwise fixed to box 226 and head 213 to positively hold it in supporting position.

The supporting structures 281, 287 in FIG. 15 provide for retrofit of the digester 211 much like the support skirt 83 allows retrofit of the impregnation vessel 115 in the FIG. 5 embodiment, and a similar method of utilizing the digester 211 may be employed compared to the method of utilizing the impregnation vessel 11' described above, including by removing the conventional mechanical discharge (rotor) from the bottom of the digester 211, installing the outlet 210, and then operating the digester to effect cooking (and typically washing) within the continuous digester 211, and continuous discharge of the pulp out the outlet through the discharge transition 210 without bringing any moving mechanical elements into contact with the pulp within the digester 211 to facilitate discharge thereof.

While the invention has been herein shown and described in what is presently conceived to be the most practical and preferred embodiment it will be apparent to those of ordinary skill in the art that many modifications may be made thereof within the scope of the invention, which scope is to be accorded the broadest interpretation of the appended claims so as to encompass all equivalent systems, devices, and methods.

What is claimed is:

1. A method of utilizing a continuous digester for cooking comminuted cellulosic fibrous material with cooking liquor to produce pulp, the digester having an outlet having a mechanical discharge device located within a shell of the digester to facilitate discharge of pulp therefrom, said method comprising the steps of:

(a) removing the mechanical discharge device from the outlet of the digester, out of the digester shell; then (b) installing within the outlet, within the digester shell, a discharge transition having one dimensional convergence and side relief so that the pulp must pass through the discharge transition to pass from the interior of the digester to the outlet; and then (c) operating the digester to effect cooking of the material with cooking liquor within the vessel interior and discharge of the pulp produced out the outlet through the discharge transition without bringing any moving mechanical elements into contact with the material or pulp within the vessel to facilitate discharge thereof.

2. A method as recited in claim 1 wherein the digester includes a bottom hemispherical head; and wherein step (b) is practiced, at least in part, by supporting the discharge transition on a conical support skirt engaging the head.

3. A method as recited in claim 1 wherein step (b) is practiced to provide nozzles for the introduction of dilution liquid into the material as it flows in the discharge transition; and wherein step (c) is practiced to introduce dilution liquid through the nozzles into the material as it flows in the discharge transition.

4. A method as recited in claim 3 wherein the digester includes a bottom hemispherical head; and wherein step (b) is practiced, at least in part, by supporting the discharge transition on a conical support skirt engaging the head.

5. A method as recited in claim 4 wherein step (c) is practiced to introduce dilution liquid through the nozzles into the pulp below the head as the pulp flows in the discharge transition.

6. A method as recited in claim 1 wherein step (c) is practiced to cause the material to flow through a device having one-dimensional convergence and side relief.

7. A method as recited in claim 6 wherein the device with one-dimensional convergence and side relief comprises at least two sloping sides; and wherein step (b) is practiced by inserting braces between the digester and the sloping sides.

8. A method as recited in claim 7 wherein the digester includes a bottom hemispherical head; and wherein step (b) is practiced, at least in part, by supporting the discharge transition on a conical support skirt engaging the head.

9. A method of controlling the operation of a vessel containing comminuted cellulosic fibrous material having an inlet, an outlet with single convergence and side relief, and dilution liquid introduction into one or more locations in the outlet, comprising the steps of substantially continuously:

(a) automatically introducing a liquid slurry of the material into the inlet of the vessel to form a level of material in the vessel;

(b) automatically detecting the level of the material in the vessel;

(c) automatically controlling the flow of dilution liquid to the one nor more locations in the outlet in response to variations in the material level detected in step (b); and (d) automatically discharging the material slurry from the outlet of the vessel.

10. A method as recited in claim 9 wherein step (c) is practiced by closed loop control of at least one automatic valve.

11. A continuous digester for digesting comminuted cellulosic fibrous material to produce cellulose pulp, comprising:

a substantially cylindrical upright vessel having a top and a bottom, a first circular cross section at the top thereof, and a second circular cross section at the bottom thereof that is greater than the first cross section, said vessel being at least forty feet high;

a pulp outlet from the bottom of said vessel, said pulp outlet having a third cross-section that is less than one-fifth the cross-sectional area of said second cross section;

a screen for extracting liquid from material and causing the extracted liquid to pass outside of said vessel, said screen mounted above said pulp outlet; and discharge means between said screen and said pulp outlet for causing pulp to flow without hangup and without bringing any moving mechanical element into contact therewith from below said screen to said pulp outlet, said vessel interior below said screen being devoid of moving mechanical elements which come into contact with pulp, comprising a discharge transition with one dimensional convergence and side relief including: a first, uppermost, portion having a generally right rectangular parallelepiped configuration including opposite side faces having generally triangular shapes, and providing one dimensional convergence and side relief; a second portion tapering from a generally rectangular parallelepiped configuration at an upper part thereof to a generally circular configuration at a lower part thereof and having opposite side faces having generally triangular shapes which align with said first portion generally triangular shapes to define substantially diamond shaped wail portions; a third portion substantially the same as said first portion, only smaller, and connected to said second portion lower part; and a fourth, lowermost, portion substantially the same as said second portion only smaller, and connected to said third portion in the same manner as said second portion is connected to said first portion, and connected to said pulp outlet; and wherein said discharge means further comprises means for introducing dilution liquid into said vessel into contact with the pulp below said screen.

12. A digester as recited in claim 11 wherein said means for introducing dilution liquid comprises means for introducing dilution liquid into pulp while in said transition with one dimensional convergence and side relief.

13. A digester as recited in claim 11 further comprising a preexisting digester shell surrounding said transition, and supporting means disposed between said shell and transition for supporting said transition.

14. A digester as recited in claim 13 wherein said supporting means comprises a plurality of braces extending between said digester shell and said transition.

15. A digester as recited in claim 13 wherein said digester has a hemispherical head; and wherein said supporting means include a substantially truncated continuous or discontinuous conical skirt engaging said head and said discharge transition.

16. A digester as recited in claim 15 wherein said dilution liquid introducing means includes a dilution plenum disposed between said second and third portions of said discharge transition for introducing dilution liquid generally at the interface therebetween.

17. A digester as recited in claim 16 wherein said skirt engages said transition adjacent the bottom of said dilution plenum.

18. A digester as recited in claim 15 wherein said dilution liquid introducing means comprises at least one dilution liquid nozzle for introducing dilution liquid into said transition below said head.

19. A digester as recited in claim 12 wherein the amount of liquid introduced by said dilution liquid introducing means are controlled by a level controller controlling an automatic valve and receiving input from a level detector.

20. A digester as recited in claim 11 wherein said dilution liquid introducing means includes a dilution plenum disposed between said second and third portions of said discharge transition for introducing dilution liquid generally at the interface therebetween.

* * * * *